US012756655B2

(12) United States Patent
Lahouti et al.

(10) Patent No.: US 12,756,655 B2
(45) Date of Patent: Oct. 6, 2026

(54) DETERMINISTIC NETWORK BANDWIDTH AWARE MULTICAST FLOW PROVISIONING

(71) Applicant: Arista Networks, Inc., Santa Clara, CA (US)

(72) Inventors: Nader Lahouti, San Jose, CA (US); Ryan Andrew Morris, Ontario (CA); Sakti Aishwarya Arunachalam, San Jose, CA (US); Sudip Regmi, San Ramon, CA (US)

(73) Assignee: Arista Networks, Inc., Santa Clara, CA (US)

( * ) Notice: Subject to any disclaimer, the term of this patent is extended or adjusted under 35 U.S.C. 154(b) by 667 days.

(21) Appl. No.: 17/845,329

(22) Filed: Jun. 21, 2022

(65) Prior Publication Data

US 2023/0412490 A1 Dec. 21, 2023

(51) Int. Cl.
*H04L 45/16* (2022.01)
*H04L 45/02* (2022.01)
*H04L 45/302* (2022.01)

(52) U.S. Cl.
CPC .............. *H04L 45/16* (2013.01); *H04L 45/02* (2013.01); *H04L 45/302* (2013.01)

(58) Field of Classification Search
CPC ........ H04L 45/16; H04L 45/02; H04L 45/302
See application file for complete search history.

(56) References Cited

U.S. PATENT DOCUMENTS 6,611,528 B1 * 8/2003 Farinacci ................ H04L 45/02 370/432
6,728,777 B1 * 4/2004 Lee ......................... H04L 45/02 709/238
7,920,472 B2 * 4/2011 Porat ..................... H04L 47/822 370/398
10,230,660 B2 * 3/2019 Kulkarni ................. H04L 45/28
10,938,660 B1 * 3/2021 Kapur ................. H04L 41/0816
11,516,725 B1 * 11/2022 Martin ................... H05B 47/19
11,811,555 B2 * 11/2023 Chu ........................ H04L 45/28
(Continued)

*Primary Examiner* — Hashim S Bhatti
*Assistant Examiner* — Christopher A. Reyes
(74) *Attorney, Agent, or Firm* — Tianyi He

(57) ABSTRACT

A method and system for deterministic network bandwidth aware multicast flow provisioning. In addressing network bandwidth oversubscription, embodiments disclosed herein propose a solution through which an intelligent and deterministic methodology may be implemented for provisioning network multicast traffic flows in order to minimize, if not eliminate, network bandwidth oversubscription. To that end, embodiments disclosed herein employ a centralized network controller configured to obtain a range of aggregated network state pertinent to deterministic, network bandwidth aware multicast traffic flow programming. Said aggregated network state may be collected through a number of logical agents dispersed throughout a network, and may include network device connectivity, network path or link bandwidth capacity, and network multicast status information. The aggregated network state may be leveraged to identify available network path(s) across the network whereon network multicasts can be provisioned without oversubscribing the network bandwidth available on those network path(s).

20 Claims, 28 Drawing Sheets

(56) References Cited

U.S. PATENT DOCUMENTS

2004/0218591 A1* 11/2004 Ogawa .................... H04L 69/40 370/364
2005/0088978 A1* 4/2005 Zhang ..................... H04L 45/03 370/254
2005/0129017 A1* 6/2005 Guingo ................... H04L 41/00 370/390
2005/0282571 A1* 12/2005 Oprescu-Surcobe ........................ H04W 28/10 455/503
2006/0268871 A1* 11/2006 Van Zijst ................ H04L 45/04 370/432
2007/0189193 A1* 8/2007 Previdi ................... H04L 45/48 370/256
2008/0232275 A1* 9/2008 Eswaran ................. H04L 45/48 370/256
2012/0182862 A1* 7/2012 Cirkovic ............. H04L 41/0654 370/220
2012/0324083 A1* 12/2012 Lee ......................... H04L 67/10 709/223
2013/0266008 A1* 10/2013 Xue ........................ H04L 45/28 370/389
2013/0329727 A1* 12/2013 Rajagopalan ....... H04L 12/4641 370/390
2014/0071223 A1* 3/2014 Chatterjee ............. H04L 65/611 348/E7.083
2014/0112122 A1* 4/2014 Kapadia .................. H04L 45/74 370/219
2015/0172132 A1* 6/2015 Tessmer ................ H04L 12/462 370/390
2016/0043875 A1* 2/2016 Kotalwar ................ H04L 45/02 370/390
2016/0149980 A1* 5/2016 Karthikeyan ......... H04L 65/612 709/219
2020/0044957 A1* 2/2020 Allan .................. H04L 41/0816
2020/0280513 A1* 9/2020 Narasimhan ............ H04L 45/02
2020/0344158 A1* 10/2020 Pianigiani ............... H04L 49/70
2020/0366593 A1* 11/2020 Kaplan ................. H04L 45/308
2020/0366594 A1* 11/2020 Kaplan ................. H04L 47/806
2021/0021915 A1* 1/2021 Liu ....................... H04L 69/326
2021/0377125 A1* 12/2021 Zheng ..................... H04L 41/40
2022/0052939 A1* 2/2022 Dutta ...................... H04L 45/64
2022/0255852 A1* 8/2022 Barcaru ................ H04L 45/302
2022/0393965 A1* 12/2022 Shen ....................... H04L 45/02
2023/0412490 A1* 12/2023 Lahouti ................... H04L 45/16

* cited by examiner

DETERMINISTIC NETWORK BANDWIDTH AWARE MULTICAST FLOW PROVISIONING

BACKGROUND

In sharing content across networks, modern media broadcasters employ network multicasting to reach an ever-increasing number of receivers. In this context, a network multicast may subsequently reference a network traffic flow, representative of shared content, from a source or sender to multiple receivers through a network topology of network devices.

DETAILED DESCRIPTION

Specific embodiments disclosed herein will now be described in detail with reference to the accompanying figures.

In general, embodiments disclosed herein relate to deterministic network bandwidth aware multicast flow provisioning. Specifically, in addressing network bandwidth oversubscription, one or more embodiments disclosed herein propose a solution through which an intelligent and deterministic methodology may be implemented for provisioning network multicast traffic flows in order to minimize, if not eliminate, network bandwidth oversubscription. To that end, one or more embodiments disclosed herein employ(s) a centralized network controller configured to obtain a range of aggregated network state pertinent to deterministic, network bandwidth aware multicast traffic flow programming Said aggregated network state may be collected through a number of logical agents dispersed throughout a media network, and may include, but may not be limited to, network device connectivity, network path or link bandwidth capacity, and network multicast status information. Thereafter, the aggregated network state may be leveraged to identify available network path(s) across the media network whereon network multicasts can be provisioned without oversubscribing the network bandwidth available on those network path(s).

In sharing content across networks, modern media broadcasters employ network multicasting to reach an ever-increasing number of receivers. In this context, a network multicast (also referred to as a network multicast flow or multicast flow) may subsequently reference a network traffic flow, representative of shared content, from a source or sender to multiple receivers through a network topology of network devices.

Further, as the number of receivers grow, so do the network bandwidth requirements and the tendency for network bandwidth oversubscription. When pertaining to any single-hop or multi-hop network path, network bandwidth oversubscription may incur when the aggregate subscribed customer demand exceeds the available network bandwidth available on the given network path. As a result of network bandwidth oversubscription, overall network performance is impacted.

In the following detailed description of the embodiments disclosed herein, numerous specific details are set forth in order to provide a more thorough understanding of the various embodiments. However, it will be apparent to one of ordinary skill in the art that the disclosure may be practiced without these specific details. In other instances, well-known features have not been described in detail to avoid unnecessarily complicating the description.

Figure 1:
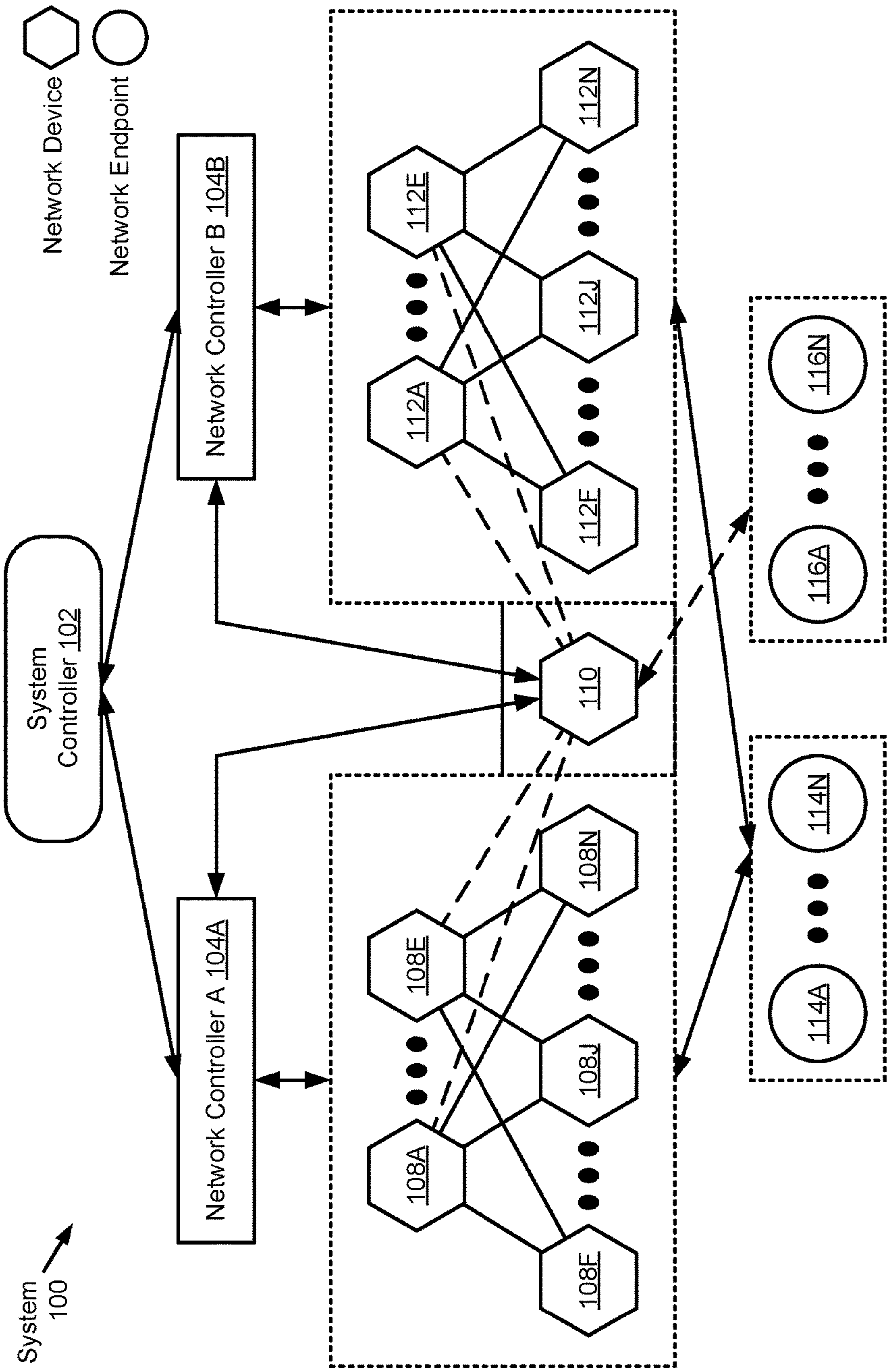
FIG. 1 shows a system in accordance with one or more embodiments disclosed herein.

FIG. 1 shows a system in accordance with one or more embodiments disclosed herein. The system (100) may resemble on-premises information disclosure (IT) infrastructure, spread across one or many enterprise datacenter(s), belonging to, and thus used for the internal purposes of, a media broadcaster. A media broadcaster, in turn, may refer to an entity or organization dedicated to the dissemination of information, via various forms of media (e.g., television, radio, Internet, etc.), to a public or subscribing audience. To that end, the system (100) may include a system controller (102), first and second network controllers (104A, 104B), a first network (106A) including a first set of single-homed network devices (108A-108N), a set of dual-homed network devices (110), a second network (106B) including a second set of single-homed network devices (112A-112N), a set of dual-homed network endpoints (114A-114N), and a set of single-homed network endpoints (116A-116N). Each of these system (100) components is described below.

In one or more embodiments disclosed herein, the system controller (102) may represent one or many physical device(s), and/or software executing on said physical device(s), that serve(s) as the central control point of the system (100). To that end, the system controller (102) may be responsible for the operational management, configuration, monitoring, automation, and/or troubleshooting of the system (100). Further, at least with respect to network multicasting, the system controller (102) may connect to the first and second network controllers (104A, 104B); and may include functionality to interact with said network controllers (104A, 104B) in order to, for example, provision, edit, and/or remove network multicast flows; and subscribe to and receive updates to network multicast state. One of ordinary skill will appreciate that the system controller (102) may perform other functionalities without departing from the scope of the disclosure. By way of examples, the system controller (102) may be implemented using one or many network server(s) and/or any number of computing systems similar to the exemplary computing system shown and described with respect to FIG. 6, below.

In one or more embodiments disclosed herein, a network controller (104A, 104B) may represent one or many physical device(s), and/or software executing on said physical device(s), that serve(s) as an orchestration point for the functions of a network (106A, 106B). To that end, a network controller (104A, 104B) may be responsible for the operational management, configuration, monitoring, automation, and/or troubleshooting of a network (106A, 106B). Further, at least with respect to network multicasting, a network controller (104A, 104B) may connect to the system controller (102), a network (106A, 106B), and the set of dual-homed network devices (110); and may include functionality to interact with at least the aforementioned system (100) components in order to, for example, receive requests from the system controller (102) concerning the provisioning, editing, and/or removal of network multicast flows; configure a network (106A, 106B) and/or the set of dual-homed network devices (110) to fulfill any received requests; obtain aggregated network state encompassing configuration and operational information pertinent to a network (106A, 106B) and/or the set of dual-homed network devices (110); and process said aggregated network state to obtain processed network state that may be published or provided to the system controller (102). One of ordinary skill will appreciate that a network controller (104A, 104B) may perform other functionalities without departing from the scope of the disclosure. By way of examples, a network controller (104A, 104B) may be implemented using one or many network server(s) and/or any number of computing systems similar to the exemplary computing system shown and described with respect to FIG. 6, below. Moreover, a network controller (104A, 104B) is illustrated and described in further detail below with respect to FIG. 2A.

In one or more embodiments disclosed herein, a network (106A, 106B) may represent a network topology of network devices (e.g., a set of single-homed network devices (108A-108N, 112A-112N) and the set of dual-homed network devices (110)) formed for the purpose of facilitating network connectivity amongst each other and any collection of connected network endpoints (e.g., the set of dual-homed network endpoints (114A-114N) and the set of single-homed network endpoints (116A-116N)). As used herein, the term connected, or connection, means there exists, between elements or components, a direct or indirect connection that enables the elements/components to interact with one another in some way. For example, such elements/components may exchange information, send instructions to perform actions, cause changes in state and/or operating condition, etc. Additionally, as used herein, a network (106A, 106B) may reflect an entire network or any portion thereof (e.g., a logical portion of the network devices within the network topology). Further, a network (106A, 106B) may include a datacenter network, a wide area network, a local area network, or any other suitable network that facilities the exchange of information from one part of the network (106A, 106B) to another.

In one or more embodiments disclosed herein, the first and second networks (106A, 106B) may each represent a redundant network of one another. That is, through network redundancy, each network (106A, 106B) may serve as duplicated infrastructure for the other network (106A, 106B), thereby ensuring an alternate network path through which any given network traffic flow (e.g., a multicast flow) between any given source-destination pair (e.g., a source or sender device and a destination or receiver pair) can propagate, especially in case(s) where a network failure may disrupt the operability of either network (106A, 106B). Further, the first and second networks (106A, 106B) may employ an active-active network redundancy configuration, whereby both networks (106A, 106B) are ideally operational at the same time and, accordingly, may service at least the set of dual-homed network endpoints (114A-114N) simultaneously and interchangeably.

In one or more embodiments disclosed herein, the first and second networks (106A, 106B) may each additionally represent a hybrid air-gapped network. A hybrid air-gapped network may refer to a network (106A, 106B) that may be physically disconnected from the public Internet and, except for connections to the set of dual-homed network devices (110), also isolated from any other network (106A, 106B). Consequently, network devices within each network (106A, 106B) are aware of and can communicate with other network devices in their respective network (106A, 106B) (including the set of dual-homed network devices (110)); and, concurrently, are unaware of and cannot communicate with network devices forming the other network (106A, 106B).

In one or more embodiments disclosed herein, a network topology may refer to an arrangement or schema through which network devices (e.g., a set of single-homed network devices (108A-108N, 112A-112N) and the set of dual-homed network devices (110)) may be interconnected. By way of an example, a network topology may reflect a bipartite network topology, which includes at least two sets of network devices, with connections between network devices of one set and network devices of another set, but no connections between network devices within a given set. Examples of said bipartite network topologies may include, but may not be limited to, a folded three-stage Clos network topology (e.g., a spine-leaf network topology), a fat tree topology (i.e., a Leiserson network topology), etc. Further, a network topology may include network devices that may be highly interconnected, with, as an example, each network device in a first set of network devices being connected to each network device in a second set of network devices within the network topology. In the exemplary embodiment shown in FIG. 1, the network topology of each network (106A, 106B) is a spine-leaf network topology. Although FIG. 1 shows an example of a spine-leaf network topology, in one or more embodiments disclosed herein, the network topology is not limited to reflecting a spine-leaf network topology (or the particular example shown), or any other example of a network topology set forth herein.

In one or more embodiments disclosed herein, in a spine-leaf network topology, the network devices of a network (106A, 106B) may be partitioned into a leaf layer (not shown) and a spine layer (not shown). The leaf layer may encompass any number of network devices (e.g., network devices (108F-108J-108N) for the first network (106A) or network devices (112F-112J-112N) for the second network (106B)) that provide network connectivity to any number of network endpoints (e.g., the set of dual-homed network endpoints (114A-114N) and/or the set of single-homed network endpoints (116A-116N)). On the other hand, the spine layer may encompass any number of network devices (e.g., network devices (108A-108E) for the first network (106A) or network devices (112A-112E) for the second network (106B)) that provide, at least, network connectivity between network devices of the leaf layer.

In one or more embodiments disclosed herein, in a spine-leaf network topology, each network device of the leaf layer may connect to each network device of the spine layer within their respective network (106A, 106B); and, similarly, each network device of the spine layer may connect to each network device of the leaf layer within their respective network (106A, 106B). The set of dual-homed network devices (110) are each an exception to the aforementioned as each dual-homed network device (110) may reside in the leaf layer of both the first and second networks (106A, 106B) and, subsequently, may connect each network device (e.g., network devices (108A-108E, 112A-112E)) of the spine layer of both the first and second networks (106A, 106B). In turn, each network device of the spine layer of both the first and second networks (106A, 106B) may connect to each dual-homed network device (110).

In one or more embodiments disclosed herein, any network device (e.g., each of the first set of single-homed network devices (108A-108N), each of the set of dual-homed network devices (110), and each of the second set of single-homed network devices (112A-112N)) may represent a physical device at least configured to facilitate communication and interaction between any pair or more of network endpoints (e.g., the set of dual-homed network endpoints (114A-114N) and/or the set of single-homed network endpoints (116A-116N)). Further, any network device may include and/or may connect to persistent storage (not shown), memory (e.g., random access memory (RAM)) (not shown), one or more computer processor(s) (e.g., integrated circuits) (not shown), and two or more physical network interfaces (also referred to as ports) (not shown).

In one or more embodiments disclosed herein, any network device may further include one or more network chips or network processors (not shown), which is/are separate component(s) from the computer processor(s) (e.g., central processing unit(s)) thereon. A network chip/processor may refer to any hardware (e.g., circuitry), software, firmware, and/or combination thereof that may include functionality to receive, process, and/or transmit network traffic based on a programmed configuration thereon. In order to perform such functionality, a network chip/processor may include any number of subcomponents, which may include, but may not be limited to, integrated circuit(s), buffer(s) (e.g., for implementing receive and/or transmit queues, such as virtual output queues (VOQs)), any type or amount of non-volatile storage, and/or any type or amount of volatile storage (e.g., RAM). Further, a network chip/processor may also include and/or connect to any number of physical network interfaces of a host network device. Such interfaces may provide a path external to the host network device (e.g., to other network devices and/or network endpoints), and/or may connect to other subcomponents internal to the host network device, where each such interface may function as an ingress and/or egress interface.

As a non-limiting example, a network chip/processor may represent hardware that receives network traffic (e.g., media access control (MAC) frames, Internet Protocol (IP) packets, etc.) at an ingress port, and determines out of which egress port(s) on the host network device to forward the network traffic.

In one or more embodiments disclosed herein, any network device may include functionality to receive network traffic (e.g., frames, packets, etc.) at any of the physical network interfaces (i.e., ports) of the network device, and to analyze the received network traffic in order to determine whether to: (i) drop the network traffic; (ii) process the network traffic; and/or (iii) transmit the network traffic, based on the processing, from one or more other physical network interfaces or ports of the network device in accordance with one or more embodiments described herein.

In one or more embodiments disclosed herein, any network device may also include functionality to store (e.g., in persistent storage, in memory, etc.) any number of data structures for facilitating operation of at least some aspects of the network device. Examples of such data structures may include, but may not be limited to, a multicast routing information base (MRIB) (not shown) and a multicast forwarding information base (MFIB) (not shown) (described below) (see e.g., FIG. 2B). Moreover, any network device may include software and/or firmware stored in any network device storage (not shown) and/or network device memory (not shown) (i.e., non-transitory computer readable mediums). Said software may include instructions which, when executed by the computer processor(s) of the network device, enable the computer processor(s) to perform operations in accordance with one or more embodiments described herein. The software instructions may take form as computer readable program code, which may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by the computer processor(s), is configured to perform functionality related to embodiments disclosed herein. The functionality of any network device is not limited to the aforementioned examples.

Examples of any network device may include, but may not be limited to, a network switch, a network router, a multilayer network switch, a fibre channel device, an InfiniBand® device, etc. Further, any network device is not limited to the aforementioned specific examples. A network device is illustrated and described in further detail below with respect to FIG. 2B.

In one or more embodiments disclosed herein, a single-homed network device (108A-108N, 112A-112N) may reference a network device that belongs to, and thus operates within, a single network (either of 106A or 106B). Further, a single-homed network device (108A-108N, 112A-112N) may interact (e.g., receive instructions and/or share network device state) with the network controller (104A, 104B) respective to the network (106A, 106B) within which they operate. Conversely, a dual-homed network device (110) may alternatively reference a network device that belongs to, and thus operates within, both networks (106A and 106B). As such, a dual-homed network device (110) may interact with both network controllers (104A, 104B).

In one or more embodiments disclosed herein, any network endpoint (e.g., each of the set of dual-homed network endpoints (114A-114N) and/or each of the set of single-homed network endpoints (116A-116N)) may represent a physical or virtual device at least configured to generate, process, and/or receive media content (e.g., audio and/or video, still graphics or images, animations, etc.). Examples of a network endpoint may include, but may not be limited to, a digital image and/or video camera, an audio codec device, an audio mixing console, a single- or multi-screen display, a headphone or headset, a microphone, an audio speaker, an audio or broadcast processor, a media encoder and/or decoder, an audio and/or video matrix control panel, a video mixer and/or switcher, a graphics engine or effects generator, multi-media stream scheduling automation software (executing on any computing system—see e.g., FIG. 6), a video wall, a multi-media recorder, etc.

In one or more embodiments disclosed herein, a dual-homed network endpoint (114A-114N) may reference a network endpoint that transmits and/or receives media content using network paths through separate networks (106A, 106B). That is, as a media content sender, a dual-homed network endpoint (114A-114N) may include functionality to transmit duplicate streams of media content—each to traverse a separate network (106A, 106B)—to reach one (e.g., unicast flow) or many (e.g., multicast flow) intended destination(s). By the same token, as a media content receiver, a dual-homed network endpoint (114A-114N) may include functionality to receive duplicate streams of media content—each having traversed a separate network (106A, 106B)—from a common source. Further, through the redundant, active-active configuration (described above) of the separate networks (106A, 106B), at least one of the duplicate streams of media content is guaranteed to arrive at the intended destination(s) (should one of the networks (either 106A or 106B) experience a network failure at any given point-in-time). Moreover, any dual-homed network endpoint (116A-116N) may directly connect to at least one single-homed network device (108A-108N) operating within the first network (106A) and at least one single-homed network device (112A-112N) operating within the second network (106B).

In one or more embodiments disclosed herein, a single-homed network endpoint (116A-116N) may alternatively reference a network endpoint that transmits and/or receives media content using network paths through a singular network (either of 106A or 106B). That is, as a media content sender, a single-homed network endpoint (116A-116N) may include functionality to transmit a singular stream of media content—to traverse one of the separate networks (either of 106A or 106B)—to reach one (e.g., unicast flow) or many (e.g., multicast flow) intended destination(s). Similarly, as a media content receiver, a single-homed network endpoint (114A-114N) may include functionality to receive a singular stream of media content—having traversed one of the separate networks (either of 106A or 106B)—from a source. Further, any singular stream of media content may or may not arrive at their intended destination(s) (depending on whether the network (either of 106A or 106B) used to propagate the singular stream of media content experiences a network failure at any given point-in-time). Moreover, any single-homed network endpoint (116A-116N) may directly connect to at least one dual-homed network device (110).

While FIG. 1 shows a configuration of components and/or subcomponents, other system (100) configurations may be used without departing from the scope of the disclosure.

Figure 2A:
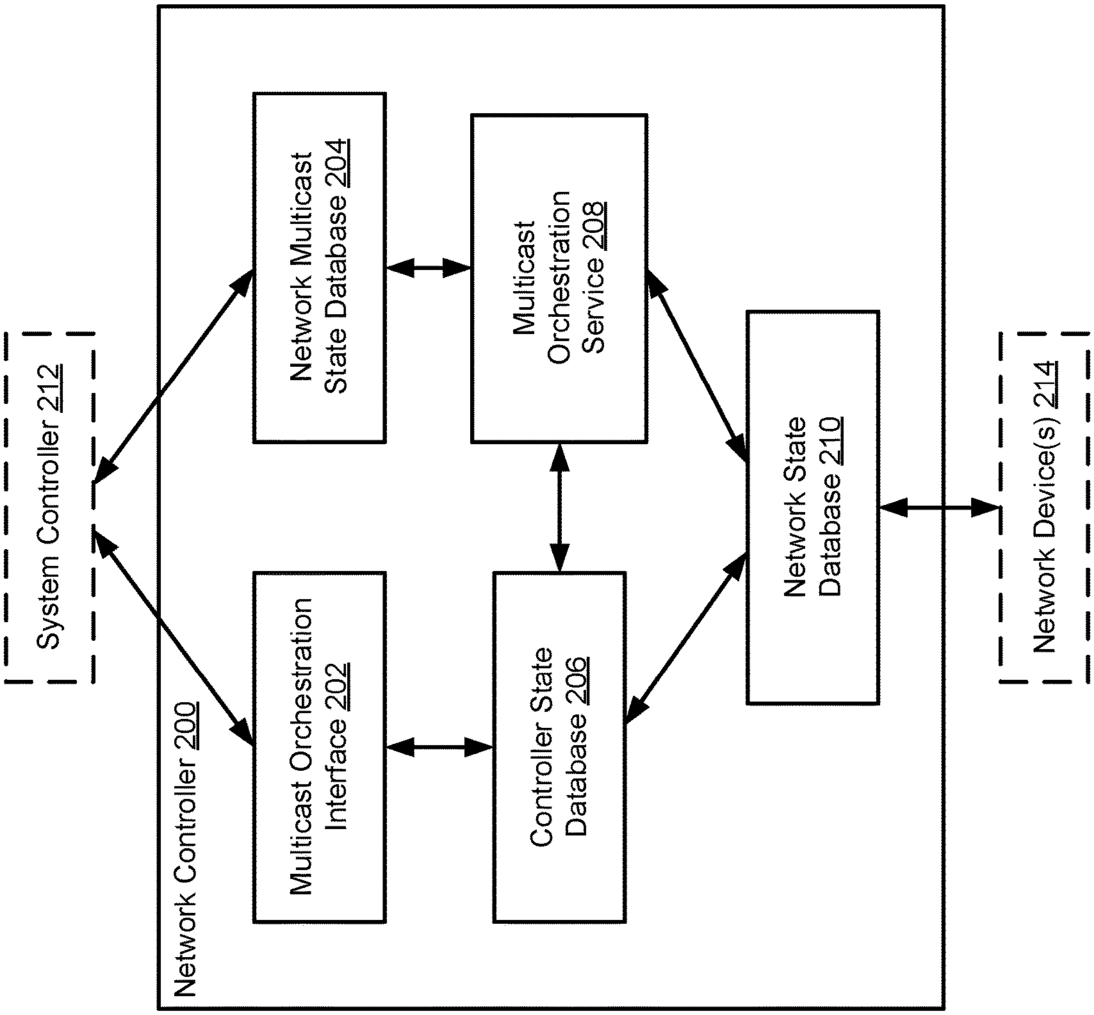
FIG. 2A shows a network controller in accordance with one or more embodiments disclosed herein.

FIG. 2A shows a network controller (described above) (see e.g., FIG. 1) in accordance with one or more embodiments disclosed herein. The network controller (200) may include, but may not be limited to, a multicast orchestration interface (202), a network multicast state database (204), a controller state database (206), a multicast orchestration service (208), and a network state database (210). Each of these network controller (200) subcomponents is described below.

In one or more embodiments disclosed herein, the multicast orchestration interface (202) may refer to networking hardware (e.g., network card or adapter), a computer program implementing a logical interface (e.g., application programming interface (API)) that may execute on the underlying hardware of the network controller (200), an interactivity protocol, or any combination thereof, that enables the system controller (212) (described above) (see e.g., FIG. 1) to submit requests (or otherwise provide instructions) to the multicast orchestration service (208). To that end, the multicast orchestration interface (202) may include functionality to: receive requests (e.g., provisioning requests, editing requests, and/or removal requests) concerning one or more multicast flow(s) from the system controller (212), where the multicast flow(s) is/are to be provisioned, edited, or removed by way of the requests; and store information relevant to (or received alongside) the requests within the controller state database (206). Further, one of ordinary skill will appreciate that the multicast orchestration interface (202) may perform other functionalities without departing from the scope of the disclosure.

In one or more embodiments disclosed herein, the above-mentioned information relevant to (or received alongside) any given request may include, but may not be limited to: a multicast source network (e.g., Internet Protocol (IP)) address associated with a source device (e.g., any sender network endpoint) of a multicast flow; a set of multicast destination network addresses associated with a set of destination devices (e.g., any set of receiver network endpoints) of the multicast flow; a maximum multicast flow bandwidth that may be used by the multicast flow; and a unique multicast flow identifier assigned to the multicast flow for quick search or indexing purposes. The above-mentioned information relevant to (or received alongside) any given request is not limited to the aforementioned specific examples.

In one or more embodiments disclosed herein, the network multicast state database (204) may refer to an in-memory (e.g., implemented in random access memory (RAM)), distributed publish-subscribe modeled data repository, where network multicast state (described below) may be transiently maintained. As used herein, the term transiently maintained means that state (or information) provided to the network multicast state database (204) is neither stored temporarily or permanently thereon, as such state (or information) is immediately consumed by subscriber(s) (e.g., system controller (212)) of the network multicast database (204) once said state (or information) is made available thereon.

Further, in one or more embodiments disclosed herein, in adopting the publish-subscribe model, the network multicast state database (204) may feature a message queuing (or messaging) system that employs one or many notification channel(s) (also referred to as message bus(es)) through which message(s) or notification(s) (including portion(s) of network multicast state) may be published thereon by one or more producer(s) (e.g., multicast orchestration service (208)). In the case of many notification channels being implemented, each notification channel may serve as a conduit for publishing (and thus subscribing to) certain network multicast state directed to a given context or topic. Examples of said network multicast state contexts may include, but may not be limited to, network interface(s) on any network device (214) operating within the network (not shown) (described above) (see e.g., FIG. 1) overseen by the network controller (200); active multicast flow(s) that have been provisioned, configured, or programmed on any network device (214) operating within the network overseen by the network controller (200); active multicast flow sender(s) (e.g., source network endpoint(s)) associated with the active multicast flow(s) provisioned, configured, or programmed on any network device (214) operating within the network overseen by the network controller (200); active multicast flow receiver(s) (e.g., destination network endpoint(s)) associated with the active multicast flow(s) provisioned, configured, or programmed on any network device (214) operating within the network overseen by the network controller (200); network bandwidth availability and usage on any network device (214) operating within the network overseen by the network controller (200); device link(s) (e.g., to other network device(s) (214)) stemming from any network device (214) operating within the network overseen by the network controller (200); and endpoint link(s) (e.g., to network endpoint(s)) stemming from any network device (214) operating within the network overseen by the network controller (200). Further, the network multicast state contexts are not limited to the aforementioned specific examples.

In one or more embodiments disclosed herein, the controller state database (206) may refer to an in-memory (e.g., implemented in RAM), distributed publish-subscribe modeled data repository, where a complete state of the network controller (200) may be maintained. As used herein, controller state refers to the aggregation or collection of agent state from at least a subset (if not all) of the agents (i.e., computer programs or processes thereof that may implement or manage one or more roles for which their host (e.g., network controller (200), network device (214), etc.) may be responsible) operating on the network controller (200). To that end, the controller state database (206) may facilitate the synchronization of state among said agents (e.g., multicast orchestration interface (202), multicast orchestration service (208)), which may be executing on the underlying hardware of the network controller (200), by notifying interested agents when there is a change in said state (or portion(s) thereof). That is, agents on the network controller (200) may subscribe to the controller state database (206) to be notified when the maintained controller state (or portion(s) thereof of interest) changes.

By way of an example, the multicast orchestration interface (202) (described above) may publish state to the controller state database (206) in the form of information relevant to (or received alongside) any given request from the system controller (212). The controller state database (206), in turn, notifies the multicast orchestration service (208), which may have subscribed to be notified of changes in the maintained controller state (or portion(s) thereof of interest) (e.g., the information relevant to (or received alongside) any given request from the system controller (212)). Thereafter, upon receiving the notification, the multicast orchestration service (208) accesses the controller state database (206) to retrieve the aforementioned information relevant to (or received alongside) any given request, which may then be processed or otherwise used in accordance with the function(s) (described below) of the multicast orchestration service (208).

In one or more embodiments disclosed herein, the multicast orchestration service (208) may refer to an agent (described above) that operates on the network controller (200), which may be configured to, at least in part, orchestrate aspects of network multicasting across the network of network devices (214) overseen by the network controller (200). These network multicasting aspects may include, but may not be limited to, the implementation of deterministic network bandwidth aware multicast flow provisioning, the implementation of multicast flow restoration following network failure detection, and the implementation of centralized network multicast state publication. One of ordinary skill, however, may appreciate that the multicast orchestration service (208) may perform other functions without departing from the scope of the disclosure.

In one or more embodiments disclosed herein, at least concerning the implementation of deterministic network bandwidth aware multicast flow provisioning, the multicast orchestration service (208) may include functionality to: subscribe to the network state database (210) regarding interested contexts or portions (e.g., pertinent to network multicasting) of aggregated network state (described below) maintained therein; based on the subscription, receive notifications from the network state database (210) triggered by updates or changes to the interested contexts/portions of aggregated network state maintained therein; in response to the notifications, retrieve said updates or changes to the interested contexts/portions of aggregated network state from the network state database (210); subscribe to the controller state database (206) regarding interested contexts or portions (e.g., pertinent to network multicasting) of controller state (described above) maintained therein; based on the subscription, receive notifications from the controller state database (206) triggered by updates or changes to the interested contexts/portions of controller state maintained therein; in response to the notifications, retrieve said updates or changes to the interested contexts/portions of controller state from the controller state database (206); based on the retrieved updates/changes to interested contexts/portions of maintained aggregated network state and/or controller state, identify one or more network paths (while preventing bandwidth oversubscription) through the network of network devices (214), managed by the network controller (200), that connect a source network endpoint and a set of destination network endpoints; and provision a multicast flow along the identified network path(s) via instructions to a multicast orchestration client (not shown) (described below) (see e.g., FIG. 2B) operating on each of at least a portion of the managed network devices (214), where each of the at least portion of managed network devices (214) may be situated along the identified network path(s). Further details surrounding the aforementioned functionalities are described with respect to FIGS. 3A and 3B, below.

In one or more embodiments disclosed herein, at least concerning the implementation of multicast flow restoration following network failure detection, the multicast orchestration service (208) may include functionality to: subscribe to the network state database (210) regarding interested contexts or portions (e.g., pertinent to network multicasting) of aggregated network state (described below) maintained therein; based on the subscription, receive notifications from the network state database (210) triggered by updates or changes to the interested contexts/portions of aggregated network state maintained therein; in response to the notifications, retrieve said updates or changes to the interested contexts/portions of aggregated network state from the network state database (210); based on the retrieved updates/changes to interested contexts/portions of maintained aggregated network state, detect one or more network failures (e.g., network link failure(s) and/or network device failure(s)) being experienced on or across the network of network devices (214) managed by the network controller (200); identify one or more multicast flows (which had been previously provisioned, configured, or programmed on or across the network of network devices (214)) impacted by the detected network failure(s); and restore the impacted multicast flow(s) (if feasible). Further details surrounding the aforementioned functionalities are described with respect to FIGS. 4A-4D, below.

In one or more embodiments disclosed herein, at least concerning the implementation of centralized network multicast state publication, the multicast orchestration service (208) may include functionality to: subscribe to the network state database (210) regarding interested contexts or portions (e.g., pertinent to network multicasting) of aggregated network state (described below) maintained therein; based on the subscription, receive notifications from the network state database (210) triggered by updates or changes to the interested contexts/portions of aggregated network state maintained therein; in response to the notifications, retrieve said updates or changes to the interested contexts/portions of aggregated network state from the network state database (210); process the retrieved updates/changes to interested contexts/portions of maintained network state to produce network multicast state; and publish the produced network multicast state using one or more notification channel(s) of the network multicast state database (204) (described above). Further details surrounding the aforementioned functionalities are described with respect to FIGS. 5A-5C, below.

Examples of contexts or portions of aggregated network state of interest to the multicast orchestration service (208) may include, but may not be limited to: a link status (e.g., up/active/connected, down/inactive/unconnected, etc.) for each network link stemming from each network device in the network of network devices (214) managed by the network controller (200); link bandwidth information for (e.g., remaining or available network bandwidth supported by) each network link stemming from each network device in the network of network devices (214) managed by the network controller (200); and a multicast flow configuration and status for each of any multicast flow(s) (which had been previously provisioned, configured, or programmed on or across the network of network devices (214) managed by the network controller (200)). Further, the contexts or portions of aggregated network state of interest to the multicast orchestration service (208) are not limited to the aforementioned specific examples.

Examples of contexts or portions of controller state of interest to the multicast orchestration service (208) may include, but may not be limited to: information published into the controller state database (206) by the multicast orchestration interface (202), which may be relevant to (or received alongside) any given request directed to network multicasting from the system controller (212). Said information may include, but may not be limited to: a source network (e.g., Internet Protocol (IP)) address associated with a source device (e.g., any sender network endpoint) of a multicast flow; a multicast destination group network address linked to a set of destination network addresses associated with a set of destination devices (e.g., any set of receiver network endpoints) of the multicast flow; a maximum multicast flow bandwidth that may be used by the multicast flow; and (optionally) a unique multicast flow identifier assigned to the multicast flow for quick search or indexing purposes. The above-mentioned information relevant to (or received alongside) any given request is not limited to the aforementioned specific examples.

In one or more embodiments disclosed herein, the network state database (210) may refer to an in-memory (e.g., implemented in RAM), distributed publish-subscribe modeled data repository, where a complete state of each network device (214), operating within the network overseen by the network controller (200), may be maintained. As used herein, aggregated network state refers to the aggregation or collection of network device state from at least a subset (if not all) of the network devices managed by the network controller (200). Further, the network state database (210) may facilitate the synchronization of state therein (or at least a portion thereof) to agents (described above) on the network controller (200) that have subscribed to be notified of changes to said aggregated network state (or portion(s) thereof of interest).

By way of an example, one or more network devices (214), managed by the network controller (200), may publish state to the network state database (210) in the form of updated network topology information. The network state database (210), in turn, notifies the multicast orchestration service (208), which may have subscribed to be notified of changes in the maintained aggregated network state (or portion(s) thereof of interest) (e.g., the updated network topology information). Thereafter, upon receiving the notification, the multicast orchestration service (208) accesses the network state database (210) to retrieve the aforementioned updated network topology information, which may then be processed or otherwise used in accordance with the function(s) (described above) of the multicast orchestration service (208).

In one or more embodiments disclosed herein, aggregated network state, which may be maintained on the network state database (210), may be non-homogeneous (or non-uniform) throughout. That is, the various network device state, from which aggregated network state derives, may be formatted or may present state through different schemas. Each schema may be associated with a database version of a device state database (see e.g., FIG. 2B) that may be employed on a given network device (214). Accordingly, each said schema may also be referred herein as a database-specific state schema.

In one or more embodiments disclosed herein, network multicast state, which may be transiently maintained (defined above) on the network multicast state database (204), may be homogeneous (or uniform) throughout. That is, contrary to the above-mentioned aggregated non-homogeneous network state, any network multicast state extracted therefrom may not conform to any database version(s) of a device state database employed on any network device(s) (214). Any network multicast state, accordingly, may be formatted or presented using a common schema, which may also be referred herein as a database-agnostic state schema.

While FIG. 2A shows a configuration of components and/or subcomponents, other network controller (200) configurations may be used without departing from the scope of the disclosure. For example, in one or more embodiments disclosed herein, the multicast orchestration service (208) may subsume one or more of the other network controller (200) subcomponents, as well as their respective functionalities described above.

Figure 2B:
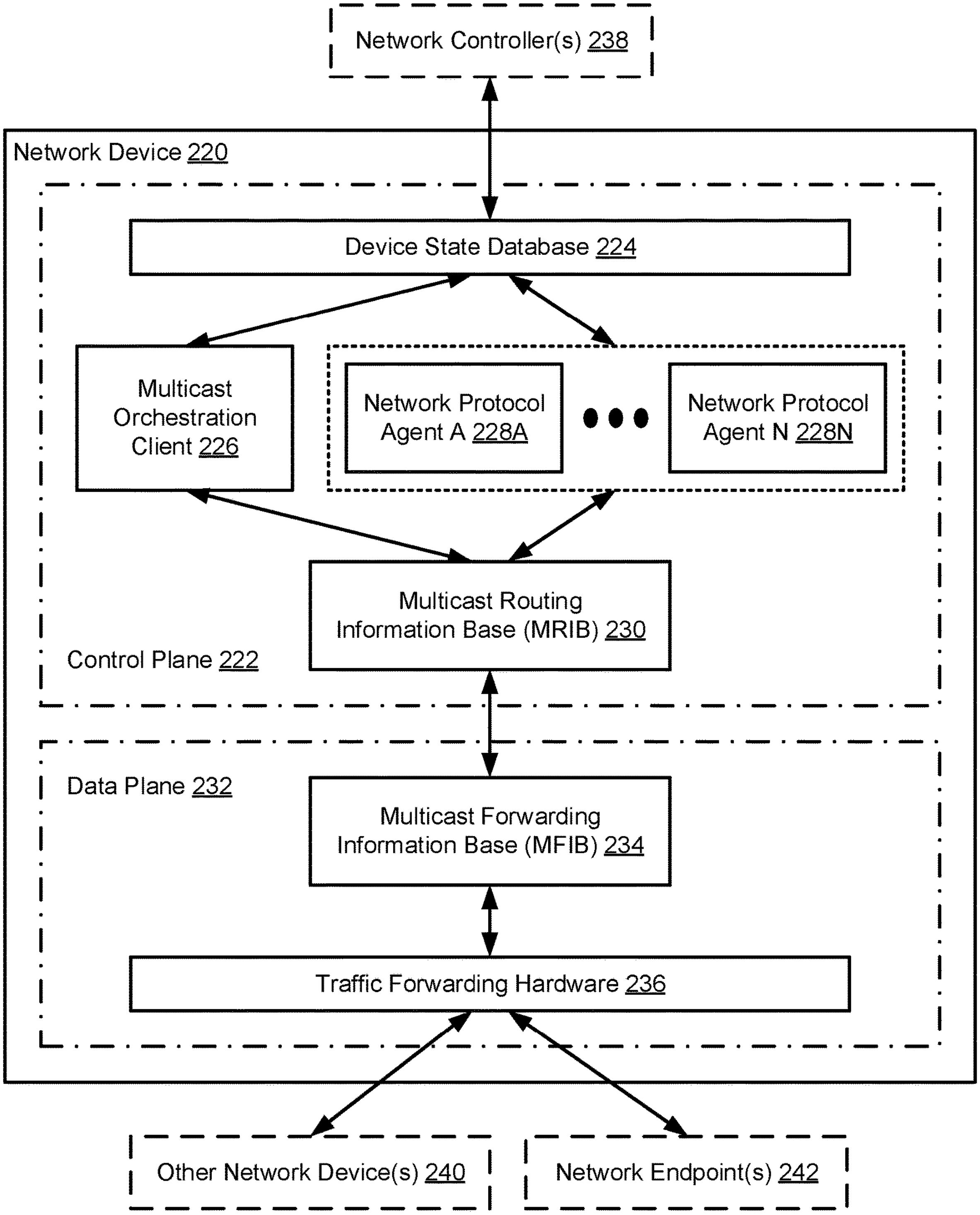
FIG. 2B shows a network device in accordance with one or more embodiments disclosed herein.

FIG. 2B shows a network device (described above) (see e.g., FIG. 1) in accordance with one or more embodiments disclosed herein. The network device (220) may include, but may not be limited to, a control plane (222) and a data plane (232). The control plane (222) may represent a portion of the network device (220) architecture responsible for determining where to send network traffic. The determinations may rely, at least in part, on a dynamically changing network topology maintained by the control plane (222) through the sharing of routing (and/or other networking) protocol information amongst the network device (220) and the other network devices (240) of the network (not shown). The data plane (232), on the other hand, may represent another portion of the network device (220) architecture responsible for forwarding network traffic. Further, the data plane (232) may process and forward network traffic to one or many destination(s) (e.g., other network device(s) (240) and/or network endpoint(s) (242)) based on various data structures, policies, rules, and/or other information and instructions, which may be configured, managed, and updated by the control plane (222).

In one or more embodiments disclosed herein, the control plane (222) may include, but may not be limited to, a device state database (224), a multicast orchestration client (226), a set of network protocol agents (228A-228N), and a multicast routing information base (MRIB) (230). Each of these control plane (222) subcomponents is described below.

In one or more embodiments disclosed herein, the device state database (224) may refer to an in-memory (e.g., implemented in RAM), distributed publish-subscribe modeled data repository, where a complete state of the network device (220) may be maintained. As used herein, network device (or device) state refers to the aggregation or collection of agent state from at least a subset (if not all) of the agents (described above) (see e.g., FIG. 2A) operating on the network device (220). To that end, the device state database (224) may facilitate the synchronization of state among said agents (e.g., multicast orchestration client (226), network protocol agent(s) (228A-228N)), which may be executing on the underlying hardware of the network device (220), by notifying interested agents when there is a change in said state. That is, agents on the network device (220) may subscribe to the device state database (224) to be notified of changes to said network device state (or portion(s) thereof of interest), which may be pertinent to their respective functions or roles on the network device (220).

In one or more embodiments disclosed herein, the multicast orchestration client (226) may refer to an agent (described above) that operates on the network device (220), which may be configured to, at least in part, implement aspects of network multicasting orchestrated by a network controller (e.g., if the network device (220) functions as a single-homed network device) or both network controllers (e.g., if the network device (220) functions as a dual-homed network device). To that end, the multicast orchestration client (226) may include functionality to: receive multicast flow provisioning instructions, multicast flow editing instructions, and/or multicast flow removal instructions from one or both network controller(s) (238) directly, or indirectly via the device state database (224); based on the received instructions, program the MRIB (230) to provision, edit, and/or remove one or many multicast flow(s) that, at least in part, traverse through the network device (220); and update its respective agent state to reflect change(s) performed to the MRIB (230). One of ordinary skill, however, may appreciate that the multicast orchestration client (226) may perform other functionalities without departing from the scope of the disclosure.

In one or more embodiments disclosed herein, a network protocol agent (228A-228N) may refer to an agent (described above) that operates on the network device (220), which may be configured to implement a networking protocol pertinent to network multicasting. Examples of said networking protocols may include, but may not be limited to: a protocol independent multicast (PIM) protocol, an Internet group management protocol (IGMP), a simple network management protocol (SNMP), a link layer discovery protocol (LLDP), a distance vector multicast routing protocol (DVMRP), a multicast open shortest path first (MOSPF) protocol, a multicast border gateway protocol (MBGP), a multicast source discovery protocol (MSDP), a multicast listener discovery (MLD) protocol, and a multicast registration protocol (MRP). Further, each network protocol agent (228A-228N) may include functionality to: share and/or gather network multicasting information, relevant to their respective networking protocol objectives, with and/or from neighbor network devices (240); and program the MRIB (230) (e.g., to provision, edit, and/or remove one or many multicast flow(s)), at least in part, based on the shared and/or gathered network multicasting information. One of ordinary skill, moreover, may appreciate that any network protocol agent (228A-228N) may perform other functionalities without departing from the scope of the disclosure.

In one or more embodiments disclosed herein, the MRIB (230) may represent an in-memory (e.g., implemented in RAM) data structure configured to store routing information related to one or more multicast flows, which may, at least in part, traverse the network device (220). Further, said multicast flow routing information for a given multicast flow may be maintained as or in a MRIB entry (not shown) in the MRIB (230). The aforementioned multicast flow routing information, pertinent to a given multicast flow and stored in a given MRIB entry, may include, but may not be limited to, a source network (e.g., IP) address associated with a source or sender network endpoint (242) from which the given multicast flow originates; a multicast destination group network address associated with a multicast destination group, where member(s) of the multicast destination group include the destination network endpoint(s) on which the given multicast flow terminate(s); an ingress or inbound network interface of the network device (220) through which network traffic of the given multicast flow may be received by the network device (220); and one or many egress or outbound network interface(s) of the network device (220) through which network traffic of the given multicast flow may be forwarded by the network device (220). Each MRIB entry may include additional or alternative information without departing from the scope of the disclosure.

In one or more embodiments disclosed herein, the data plane (232) may include, but may not be limited to, a multicast forwarding information base (MFIB) (234) and traffic forwarding hardware (236). Each of these data plane (232) subcomponents is described below.

In one or more embodiments disclosed herein, the MFIB (234) may represent an in-memory (e.g., implemented in RAM) data structure configured to store forwarding information related to one or more multicast flows, which may, at least in part, traverse the network device (220). Further, said multicast flow forwarding information for a given multicast flow may be maintained as or in a MFIB entry (not shown) in the MFIB (234). The aforementioned multicast flow forwarding information, pertinent to a given multicast flow and stored in a given MFIB entry, may include, but may not be limited to, a source network (e.g., IP) address associated with a source or sender network endpoint (242) from which the given multicast flow originates; a multicast destination group network address associated with a multicast destination group, where member(s) of the multicast destination group include the destination network endpoint(s) on which the given multicast flow terminate(s);

an ingress or inbound network interface of the network device (220) through which network traffic of the given multicast flow may be received by the network device (220); and one or many egress or outbound network interface(s) of the network device (220) through which network traffic of the given multicast flow may be forwarded by the network device (220). Each MFIB entry may include additional or alternative information without departing from the scope of the disclosure. Moreover, the MFIB (234) may be programmed by the MRIB (230).

In one or more embodiments disclosed herein, the traffic forwarding hardware (236) may represent circuitry collectively configured to at least receive, determine where to send, and then forward multicast network traffic. At a minimum, components of the traffic forwarding hardware (236) may include a network chip (or network processor) (not shown) and multiple physical network interfaces (or ports) (not shown). The network chip may refer to a specialized integrated circuit predominantly responsible for the processing and forwarding at least multicast network traffic that may be traversing the network device (220) in order to reach one or many adjacent network device(s) (240) and/or one or many network endpoint(s) (242). To perform the aforementioned functionality, the network chip may utilize data structures (e.g., the MFIB (234)), rules, and/or policies in order to determine out of which physical network interface(s) to forward any received multicast network traffic. Each physical network interface, on the other hand, may refer to circuitry that serves as a point of interconnection between the network device (220) and an adjacent network device (240) or a network endpoint (242). Each physical network interface, further, may include functionality to receive and/or transmit bit streams (at least forming multicast network traffic) across physical or wired connections (e.g., via copper-wired Ethernet cable, fiber-optic cable, etc.) from and/or to an adjacent network device (240) or a network endpoint (242). The traffic forwarding hardware (236) may include additional components, as well as perform additional functionalities, without departing from the scope of the disclosure.

While FIG. 2B shows a configuration of components and/or subcomponents, other network device (220) configurations may be used without departing from the scope of the disclosure.

Figure 3A:
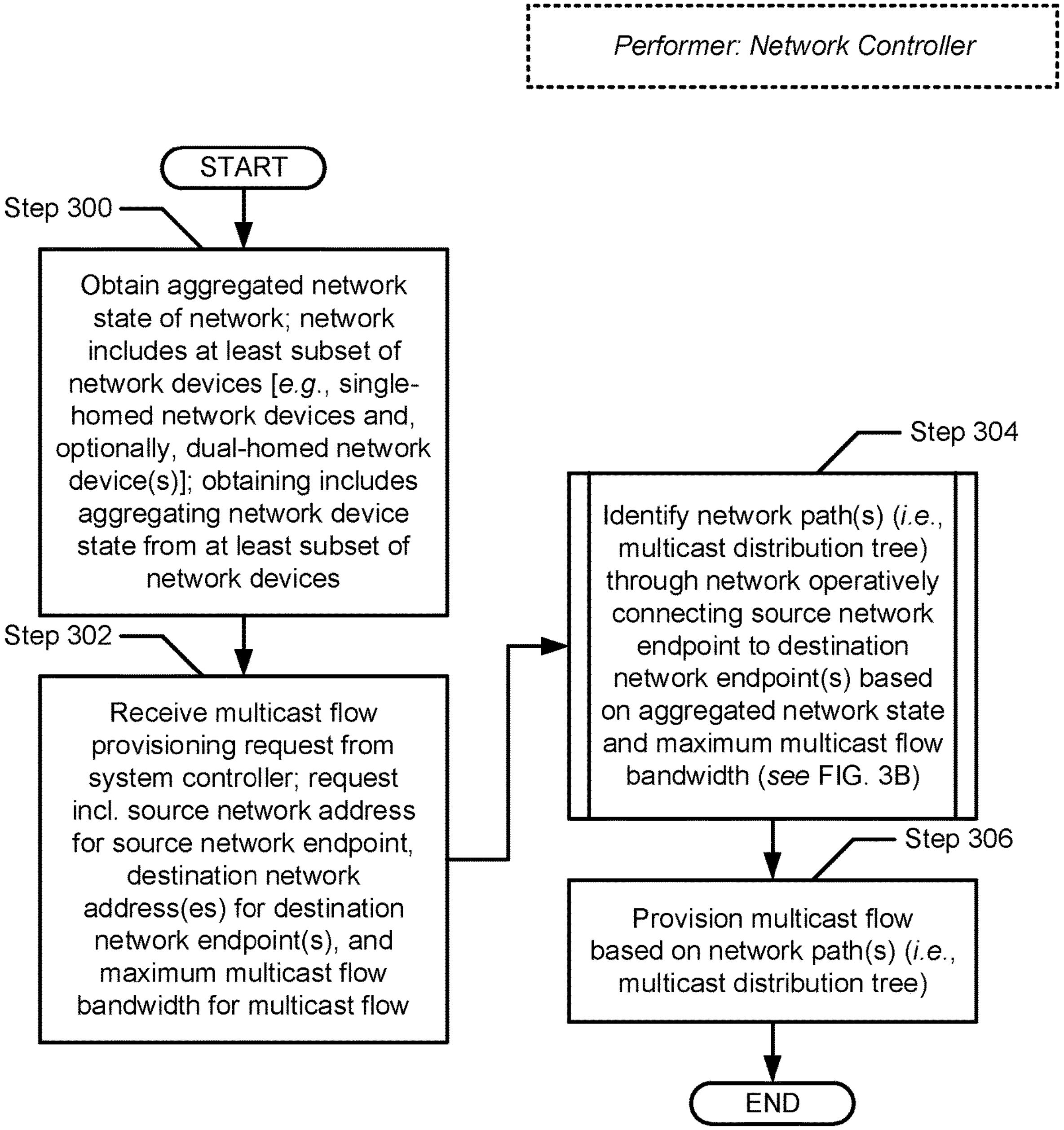
FIG. 3A shows a flowchart describing a method for deterministic network bandwidth aware multicast flow provisioning in accordance with one or more embodiments disclosed herein.

FIG. 3A shows a flowchart describing a method for deterministic network bandwidth aware multicast flow provisioning in accordance with one or more embodiments disclosed herein. The various steps outlined below may be performed by a network controller (see e.g., FIGS. 1 and 2B). Further, while the various steps in the flowchart are presented and described sequentially, one of ordinary skill will appreciate that some or all steps may be executed in different orders, may be combined or omitted, and some or all steps may be executed in parallel.

Turning to FIG. 3A, in Step 300, aggregated network state is obtained. In one or more embodiments disclosed herein, as used herein aggregated network state refers to the aggregation or collection of network device state from at least a subset (if not all) of the network devices in a network, which may be managed by the network controller. The network devices, from which network device state may be obtained, may include the single-homed network devices (described above) (see e.g., FIG. 1) operating within, and dual-homed network device(s) (described above) (see e.g., FIG. 1) operating at least within, the aforementioned network.

In Step 302, a multicast flow provisioning request is received from a system controller (described above) (see e.g., FIG. 1). In one or more embodiments disclosed herein, the multicast flow provisioning request may pertain to a (new) multicast flow sought to be provisioned, configured, or programmed onto the network. A multicast flow (also referred to herein as a network multicast or network multicast flow) may reference a network traffic flow, representative of shared content, from a source or sender network endpoint to multiple receiver network endpoints through a network topology of network devices. To that end, the multicast flow provisioning request may include or specify: a source network (e.g., IP) address associated with a source network endpoint; a set of destination network addresses associated with a set of destination network endpoints, respectively; and a maximum multicast flow bandwidth (e.g., expressed in gigabits per second (Gbps)) reflective of a maximum rate of data (e.g., network traffic) transfer to be expected by the (new) multicast flow across any network link used by the (new) multicast flow throughout the network.

In Step 304, a set of network paths is/are identified, at least in part, based on the aggregated network state (obtained in Step 300) and the maximum multicast flow bandwidth (received via the multicast flow provisioning request in Step 302). In one or more embodiments disclosed herein, the set of network paths may connect the source network endpoint to the set of destination network endpoints, respectively.

Further, in one or more embodiments disclosed herein, with some degree of overlap, the set of network paths may form, and thus may also be collectively referred herein as, a multicast distribution tree. A multicast distribution tree, accordingly, may represent a unidirectional connectivity graph (reflecting nodes for network devices and network endpoints, as well as edges, connecting the nodes, for network links there-between) that conveys the distribution of multicast network traffic through at least a portion of a network in order to deliver said multicast network traffic from a sender (e.g., source network endpoint) to all receivers (e.g., destination network endpoints) associated with a multicast flow. Details concerning the identification of the set of network paths (i.e., the multicast distribution tree) is further illustrated and described with respect to FIG. 3B, below.

In Step 306, the (new) multicast flow is subsequently provisioned on the network based on or along the set of network paths (or the multicast distribution tree) (identified in Step 304). In one or more embodiments disclosed herein, provisioning the (new) multicast flow may entail configuring or programming at least a subset of the network devices forming the network.

More specifically, in one or more embodiments disclosed herein, said provisioning may, for example, include: associating the set of destination network addresses (received via the multicast flow provisioning request in Step 302) with a multicast destination group network address (described below); identifying the aforementioned at least subset of network devices of the network, where each network device in the subset may be situated along the multicast distribution tree; for each network device in the at least subset of network devices: (a) selecting an ingress/inbound physical network interface (or port) on the network device that connects (or leads/points to) the network device to the source network endpoint via, at least in part, a network link coupled to the aforementioned ingress port; (b) selecting one or many egress/outbound network interface(s) (or port(s)) on the network device that connects (or leads/points to) the network device to one or many destination network endpoint(s), respectively, via, at least in part, a respective network link coupled to each of the aforementioned egress port(s); (c) generating, in association with the (new) multicast flow, multicast flow provisioning instructions that may include, but may not be limited to, the source network address (received via the multicast flow provisioning request in Step 302), the multicast destination group network address, a name or identifier for the selected ingress port on the network device, and name(s) or identifier(s) for the selected egress port(s), respectively, on the network device; and, thereafter, providing the generated multicast flow provisioning instructions to the network device.

In one or more embodiments disclosed herein, the above-mentioned multicast destination group network address may refer to any network address (e.g., IP address), within a range of network addresses, reserved for assignment to a multicast destination group. A multicast destination group, in turn, may refer to a collection or set of receiver/destination network endpoints associated with a multicast flow.

Figure 3B:
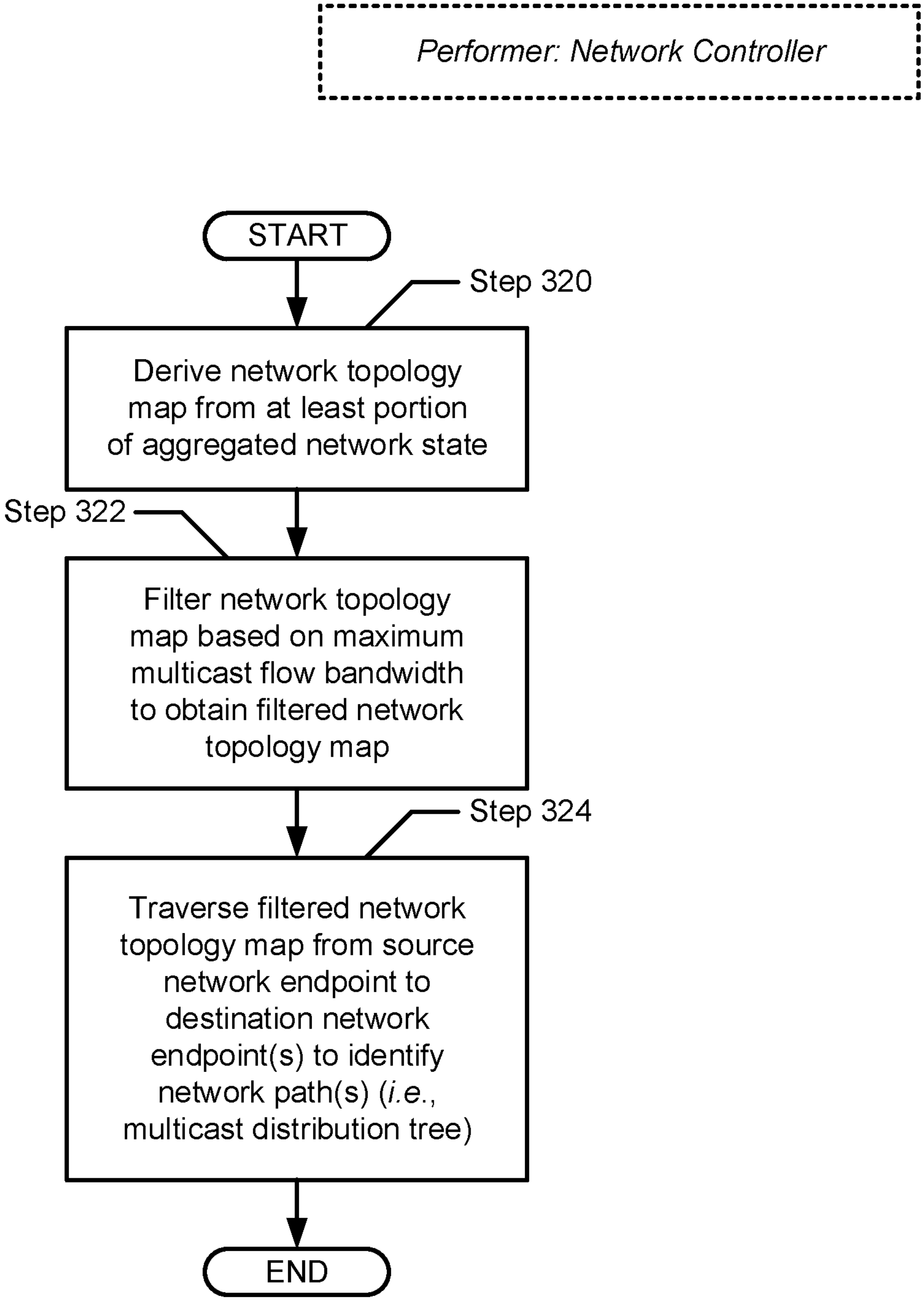
FIG. 3B shows a flowchart describing a method for identifying network paths through a network in accordance with one or more embodiments disclosed herein.

FIG. 3B shows a flowchart describing a method for identifying network paths through a network in accordance with one or more embodiments disclosed herein. The various steps outlined below may be performed by a network controller (see e.g., FIGS. 1 and 2B). Further, while the various steps in the flowchart are presented and described sequentially, one of ordinary skill will appreciate that some or all steps may be executed in different orders, may be combined or omitted, and some or all steps may be executed in parallel.

Turning to FIG. 3B, in Step 320, a network topology map is derived. In one or more embodiments disclosed herein, a network topology map may describe the physical and/or logical configuration of a network through a set of nodes (representative of network devices and network endpoints) interconnected by a set of edges (representative of network links). Further, derivation of the network topology map may rely on at least a portion of the aggregated network state obtained through the aggregation of network device state from network devices of the network (see e.g., FIG. 3A). Portion(s) of the aggregated network state, which may be pertinent to deriving the network topology map, may include, for example, information gathered by and/or shared amongst network devices of the network through certain existing network protocols. Examples of these network protocols may include, but may not be limited to, the simple network management protocol (SNMP) and the link layer discovery protocol (LLDP).

In Step 322, the network topology map (derived in Step 320) is then filtered based on a maximum multicast flow bandwidth associated with a multicast flow. In one or more embodiments disclosed herein, filtering of the network topology map may, for example, entail: associating each edge, exhibited throughout the network topology map, with an available link bandwidth (i.e., an available amount of bandwidth (expressed in Gbps) that the network link, represented by the edge, can currently support); identifying a subset of the edges in the network topology map that each reflect an associated available link bandwidth that is less than the maximum multicast flow bandwidth; and omitting, from the network topology map, the identified subset of edges. Further, through said filtering, network link(s) (or network path segment(s)) that is/are unable to support the multicast flow, due to the high likeliness of network bandwidth oversubscription incurring thereon, may be removed from consideration. As a result of the removal of one or more edges (if any) from the network topology map, one or more nodes (also referred herein as island nodes) may become disconnected from a connected remainder of the network topology map. In such circumstances, filtering of the network topology map may further include omitting the island node(s) (or any disconnected subgraph(s)) therefrom as said island node(s) (or said disconnected subgraph(s)) may not be reached or used to connect a source network endpoint to one or many destination network endpoint(s). Moreover, following said filtering of the network topology map, a filtered network topology map may be obtained.

In Step 324, the filtered network topology map (obtained in Step 322) is subsequently traversed to identify a set of network paths (or collectively, a multicast distribution tree) that may facilitate the provisioning of a multicast flow on a network. In one or more embodiments disclosed herein, each traversal of the filtered network topology map may originate at a source node, representative of a source or sender network endpoint for the multicast flow, and may terminate at a destination node representative of a destination or receiver network endpoint for the multicast flow.

In one or more embodiments disclosed herein, as any given multicast flow relies on a set of (or multiple) destination/receiver network endpoints, a traversal of the filtered network topology map may be performed (or otherwise attempted) for each destination/receiver network endpoint. Furthermore, the traversals may be performed sequentially or in parallel, and may be executed with or without constraints. By way of examples, the applied constraint(s) may include, but may not be limited to, the maximization of overlap in edges and/or nodes used amongst the multiple network paths to minimize multicast distribution tree complexity; the selection of an edge from two or more edge candidates, between any given pair of nodes, based on brute force policies or other selection criteria (e.g., shortest path(s) from the source node to the destination nodes), etc. Moreover, any traversal of the filtered network topology map may employ any existing graph or tree traversing algorithm (e.g., depth-first searching, breadth-first searching, etc.).

Figure 4A:
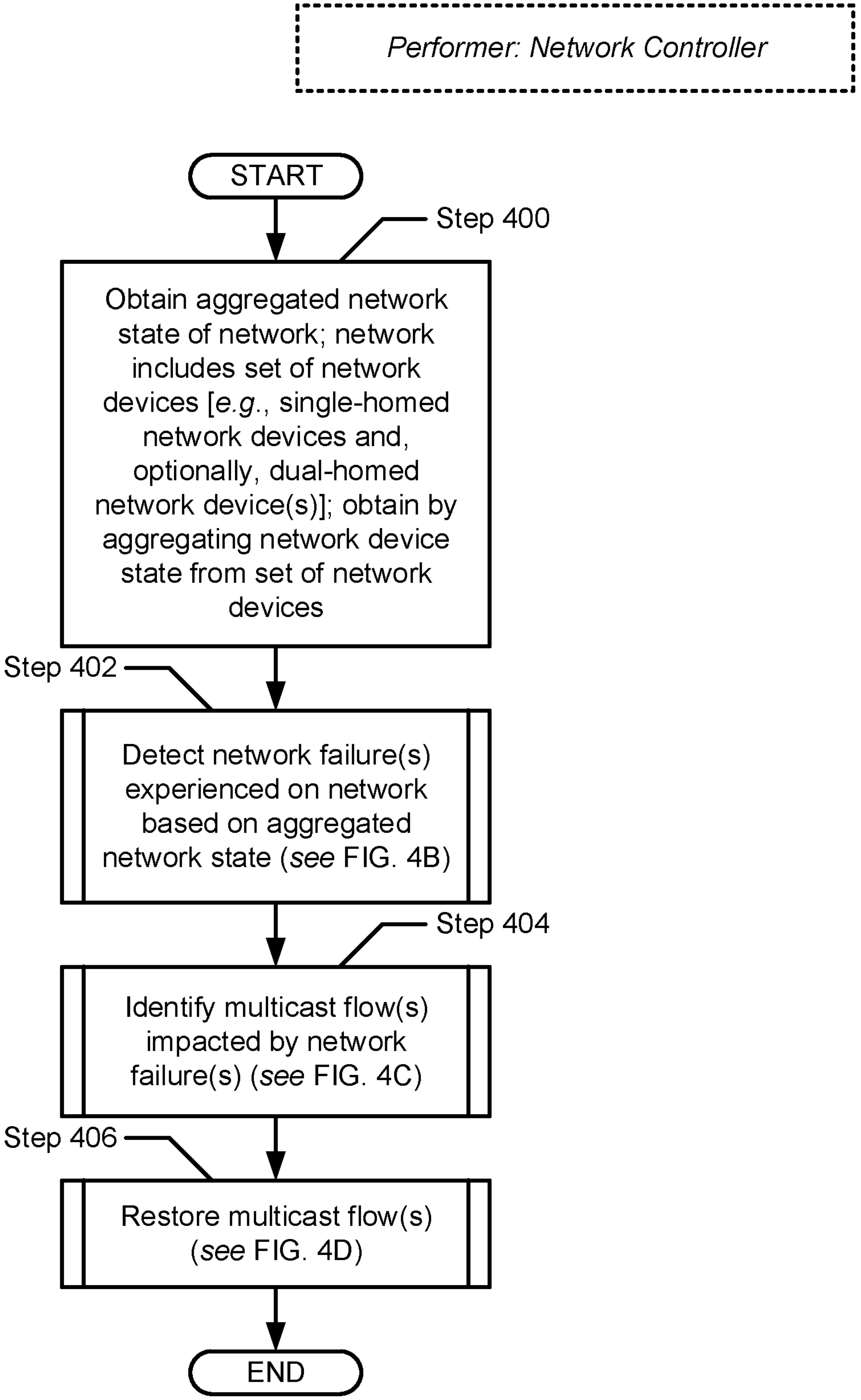
FIG. 4A shows a flowchart describing a method for multicast flow restoration following network failure detection in accordance with one or more embodiments disclosed herein.

FIG. 4A shows a flowchart describing a method for multicast flow restoration following network failure detection in accordance with one or more embodiments disclosed herein. The various steps outlined below may be performed by a network controller (see e.g., FIGS. 1 and 2B). Further, while the various steps in the flowchart are presented and described sequentially, one of ordinary skill will appreciate that some or all steps may be executed in different orders, may be combined or omitted, and some or all steps may be executed in parallel.

Turning to FIG. 4A, in Step 400, aggregated network state is obtained. In one or more embodiments disclosed herein, as used herein aggregated network state refers to the aggregation or collection of network device state from at least a subset (if not all) of the network devices in a network, which may be managed by the network controller. The network devices, from which network device state may be obtained, may include the single-homed network devices (described above) (see e.g., FIG. 1) operating within, and dual-homed network device(s) (described above) (see e.g., FIG. 1) operating at least within, the aforementioned network.

In Step 402, one or more network failure(s) is/are detected based on at least a portion of the aggregated network state (obtained in Step 400). In one or more embodiments disclosed herein, a network failure may generally refer to the inoperability of a component or components of a network, and may manifest in various forms, which may include, but may not be limited to, network link failures and network device failures. A network link failure may refer to the inoperability of a network link (e.g., a device link between network devices, or an endpoint link between a network device and a network endpoint) due to, for example, physical damage to the wired medium representative of the network link. A network device failure, on the other hand, may refer to the inoperability (or inactivity) of a network device due to, for example, a malfunction or a scheduled maintenance operation. Details concerning the detection of the network failure(s) are further illustrated and described with respect to FIG. 4B, below.

In Step 404, one or more multicast flow(s) is/are identified. In one or more embodiments disclosed herein, the identified multicast flow(s) may each be impacted by the network failure(s) (detected in Step 402). As used herein, an impacted multicast flow may refer to a multicast flow that can no longer deliver multicast network traffic to at least all receivers (e.g., destination network endpoints) associated therewith due to disruption(s) caused by, for example, one or many inactive network device(s) and/or one or many failed network link(s). Details concerning the identification of the impacted multicast flow(s) are further illustrated and described with respect to FIG. 4C, below.

In Step 406, the multicast flow(s) (identified in Step 404), which had been impacted by the network failure(s) (detected in Step 402), is/are subsequently restored. In one or more embodiments disclosed herein, restoration of the multicast flow(s) may entail the identification of alternative network path(s), for each multicast flow, such that multicast network traffic associated with the multicast flow, may once again be delivered from a sender (e.g., source network endpoint) to all receivers of the multicast flow. Details concerning the restoration of the impacted multicast flow(s) are further illustrated and described with respect to FIG. 4D, below.

Figure 4B:
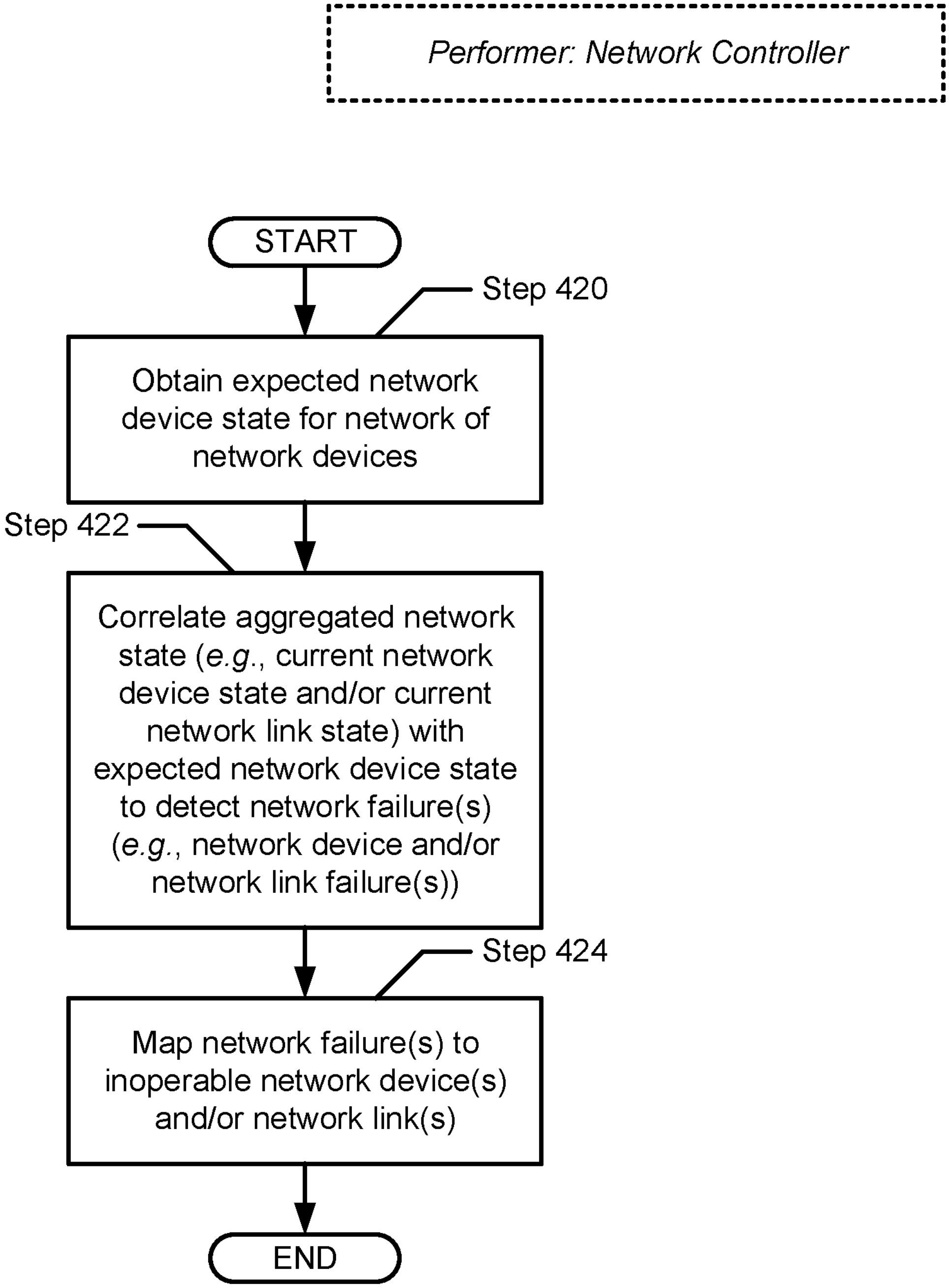
FIG. 4B shows a flowchart describing a method for detecting network failures in accordance with one or more embodiments disclosed herein.

FIG. 4B shows a flowchart describing a method for detecting network failures in accordance with one or more embodiments disclosed herein. The various steps outlined below may be performed by a network controller (see e.g., FIGS. 1 and 2B). Further, while the various steps in the flowchart are presented and described sequentially, one of ordinary skill will appreciate that some or all steps may be executed in different orders, may be combined or omitted, and some or all steps may be executed in parallel.

Turning to FIG. 4B, in Step 420, an expected network device state, for each of at least a subset (if not all) of the network devices forming a network managed by the network controller, is obtained. In one or more embodiments disclosed herein, the expected network device state for any given network device may include, but may not be limited to, expected value(s) corresponding to a set of configuration and/or operational parameters associated with the given network device. The aforementioned expected value(s), corresponding to configuration and/or operational parameter(s) associated with the given network device, may represent, for example, setting(s) programmed into the given network device by administrators thereof, and/or setting(s) applied to the given network device based on one or many operational model(s). Further, the expected network device state for any network device may be maintained by the multicast orchestration service operating on the network controller (see e.g., FIG. 2A).

In Step 422, update(s) or change(s) to aggregated network state, for the network, is correlated with the expected network device state (obtained in Step 420). In one or more embodiments disclosed herein, as aggregated network state represents an aggregation or collection of network device state associated with each of at least a subset (if not all) of the network devices forming the network, any update(s)/change(s) to said aggregated network state may correspond to update(s)/change(s) to the network device state of one or many network device(s) of the network. Further, for any given network device, the aforementioned correlation may entail comparing the network device state update(s)/change(s), relative to the given network device, against the expected value(s) of the configuration and/or operational parameter(s) of the given network device to which said update(s)/change(s) correspond. For example, a change to the network device state for a network device may relate to a link status for a network link coupled to a physical network interface of the network device. In such an example, the link status may represent a configuration and/or operational parameter associated with the network device. Subsequently, correlation may entail comparing the changed (or current) link status value against an expected value of the same. Moreover, as a result of the correlation(s), network failure(s) may be detected or identified due to one or many mismatch(es), between the changed/current value and expected value, of one or many select configuration and/or operational parameter(s) respective to any network device.

In Step 424, the network failure(s) (detected in Step 422) is/are subsequently mapped to a set of fault-originating network components, which may include inoperable network device(s) and/or inoperable network link(s). That is, in one or more embodiments disclosed herein, a network failure may be attributed to a network device failure, and thus, reflective of a network device undergoing a malfunction, in whole or in part, or of a network device undergoing scheduled maintenance and/or software/firmware upgrading. In one or more other embodiments disclosed herein, a network failure may alternatively be attributed to a network link failure, and thus, reflective of damages to the wired medium implementing the network link, or of loose/faulty coupling between the wired medium and the physical network interface(s) at either or both end(s) of the wired medium. Based on which select configuration and/or operational parameter(s) resulted in mismatch(es) between their respective changed/current and expected values (correlated in Step 422), a detected network failure may either be classified as a network device failure and mapped to a given inoperable network device, or classified as a network link failure and mapped to a given inoperable network link.

Figure 4C:
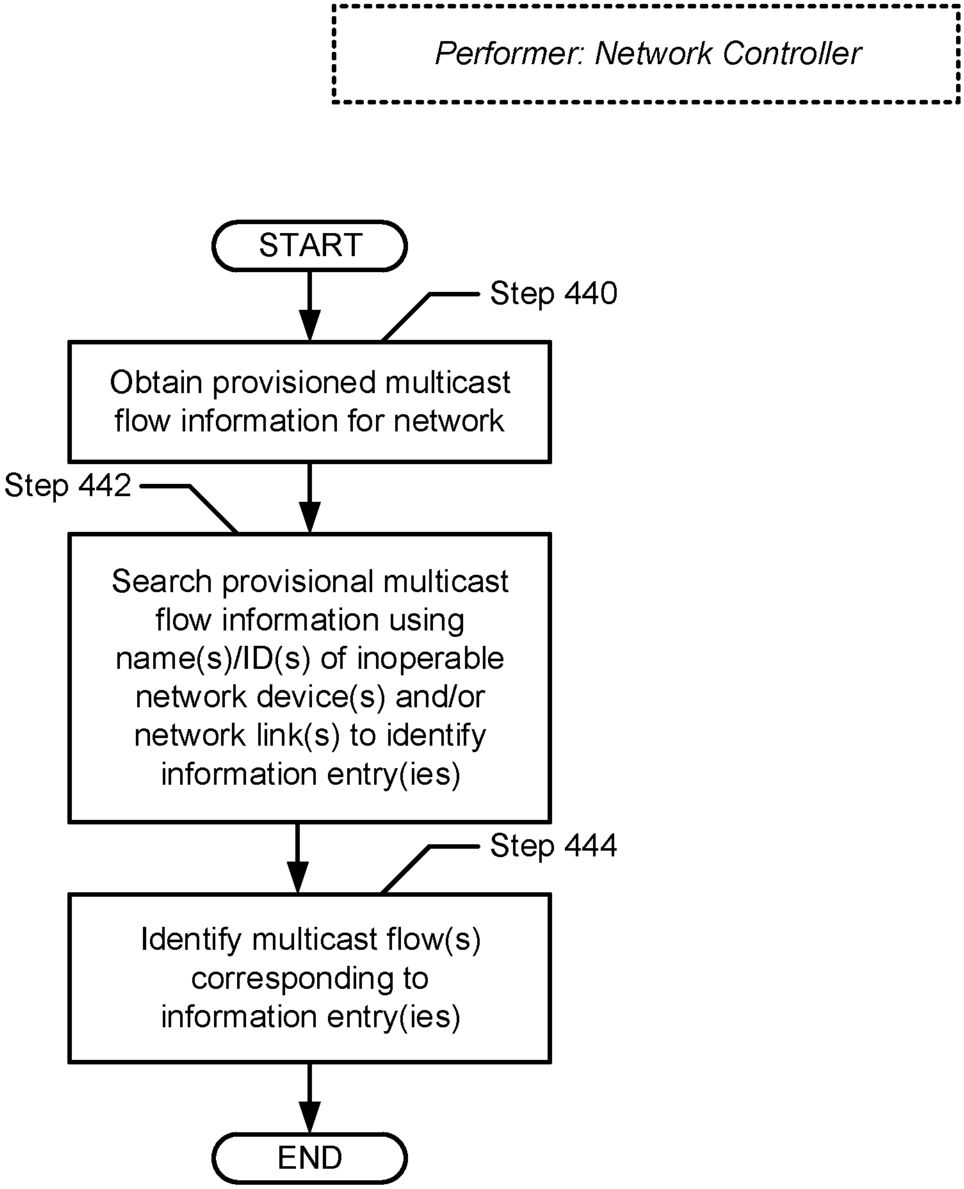
FIG. 4C shows a flowchart describing a method for identifying multicast flows impacted by network failures in accordance with one or more embodiments disclosed herein.

FIG. 4C shows a flowchart describing a method for identifying multicast flows impacted by network failures in accordance with one or more embodiments disclosed herein. The various steps outlined below may be performed by a network controller (see e.g., FIGS. 1 and 2B). Further, while the various steps in the flowchart are presented and described sequentially, one of ordinary skill will appreciate that some or all steps may be executed in different orders, may be combined or omitted, and some or all steps may be executed in parallel.

Turning to FIG. 4C, in Step 440, provisioned multicast flow information, for a network managed by the network controller, is obtained. In one or more embodiments disclosed herein, the provisioned multicast flow information may refer to a data structure (e.g., table) that maintains information descriptive of each active multicast flow provisioned, configured, or programmed to operate through at least a portion of the network. Further, descriptive information for each active multicast flow may be maintained within a respective table entry (or information entry) of the provisioned multicast flow information.

In one or more embodiments disclosed herein, for any given active multicast flow, the information entry respective thereto may include, but may not be limited to: a multicast flow identifier uniquely identifying the given active multicast flow; a source network address associated with a source network endpoint from which the given active multicast flow originates; a destination network address associated with each destination network endpoint on which the given active multicast flow terminates; a multicast destination group network address associated with a multicast destination group for the given active multicast flow, where member(s) of the multicast destination group include the destination network endpoint(s); a set of network paths each conveying a branch of a multicast distribution tree for the given active multicast flow, where each network path conveys a sequence of network devices and network links there-between (or more specifically, identifiers belonging thereto) that connects the source network endpoint with a different destination network endpoint of the given active multicast flow; and a maximum multicast flow bandwidth (e.g., expressed in gigabits per second (Gbps)) reflective of a maximum rate of data (e.g., network traffic) transfer to be expected by the given active multicast flow across any network link used thereby. Each information entry may include additional or alternative information descriptive of a respective active multicast flow without departing from the scope of the disclosure.

In Step 442, one or more searches is/are performed across the provisioned multicast flow information (obtained in Step 440). In one or more embodiments disclosed herein, the search(es) may entail using an identifier for network device(s) and/or network link(s), mapped to detected network failure(s) (see e.g., FIG. 4B), in order to identify one or more above-described information entries of the provisioned multicast flow information. An information entry may be identified based on the information entry including (as part of the set of network paths disclosed therein) one or more of the identifiers for the network device(s) and/or network link(s) mapped to the detected network failure(s).

In Step 444, one or many active multicast flow(s), which is/are considered impacted by the detected network failure(s), is/are identified. In one or more embodiments disclosed herein, the impacted active multicast flow(s) may correspond to or be associated with the information entry (entries) (identified in Step 442). For example, a detected network failure may map to network device ND2. Further, active multicast flow F1 may be associated with information entry E1 that discloses the following branches of a multicast distribution tree: (a) NL1>ND2>NL2>ND4>NL8; and (b) NL1>ND2>NL3>ND6>NL12, where: NDx refers to the identifier for network device NDx and NLy refers to the identifier for network link NLy. A search is performed across the provisioned multicast flow information using ND2 (i.e., identifier of network device ND2 mapped to the detected network failure), which results in the identification of information entry E1 because information entry E1 cites identifier ND2 therein as part of the multicast distribution tree for active multicast flow F1. Moreover, since active multicast flow F1 corresponds to information entry E1, active multicast flow F 1 is identified as an active multicast flow impacted by the detected network failure.

Figure 4D:
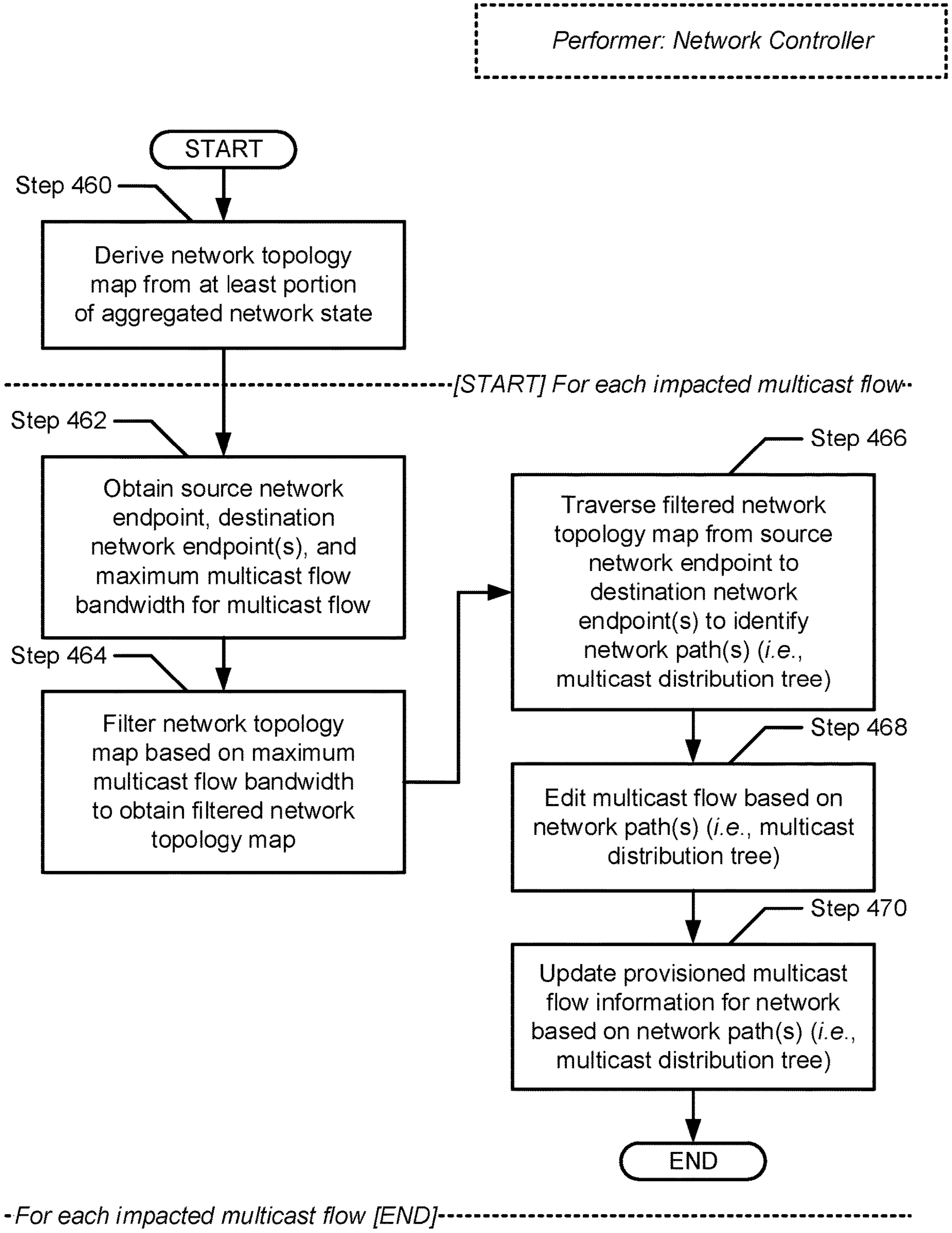
FIG. 4D shows a flowchart describing a method for restoring multicast flows in accordance with one or more embodiments disclosed herein.

FIG. 4D shows a flowchart describing a method for restoring multicast flows in accordance with one or more embodiments disclosed herein. The various steps outlined below may be performed by a network controller (see e.g., FIGS. 1 and 2B). Further, while the various steps in the flowchart are presented and described sequentially, one of ordinary skill will appreciate that some or all steps may be executed in different orders, may be combined or omitted, and some or all steps may be executed in parallel.

Turning to FIG. 4D, in Step 460, a network topology map, for a network of network devices managed by the network controller, is derived. In one or more embodiments disclosed herein, a network topology map may describe the physical and/or logical configuration of a network through a set of nodes (representative of network devices and network endpoints) interconnected by a set of edges (representative of network links). Further, derivation of the network topology map may rely on at least a portion of the aggregated network state obtained through the aggregation of network device state from network devices of the network (see e.g., FIG. 4A). As the aggregated network device state reflects changed or updated state—at least a portion of which may be indicative of one or more network failures being experienced on the network, the derived network topology map may exclude node(s) for network device(s) and/or edge(s) for network link(s) found to be related to the network failure(s). Moreover, portion(s) of the aggregated network state, which may be pertinent to deriving the network topology map, may include, for example, information gathered by and/or shared amongst network devices of the network through certain existing network protocols. Examples of these network protocols may include, but may not be limited to, the simple network management protocol (SNMP) and the link layer discovery protocol (LLDP).

Hereinafter, each of the remaining steps (i.e., Steps 462, 464, 466, 468, and 470) may be performed, iteratively as a whole, for each active multicast flow identified as impacted by one or many network failure(s) (see e.g., FIG. 4C). For example, a first iteration of the aforementioned steps may be performed with respect to a first impacted active multicast flow; thereafter, a second iteration of the aforementioned steps may be performed with respect to a second impacted active multicast flow; and so forth, including a last iteration of the aforementioned steps that may be performed with respect to a last impacted active multicast flow. Throughout any given iteration of the aforementioned steps, the impacted active multicast flow, respective to the given iteration, may be termed hereinafter as the given active multicast flow.

In Step 462, information descriptive of the given active multicast flow is obtained. In one or more embodiments disclosed herein, the obtained information may include: an identifier or source network address associated with the source network endpoint from which the given active multicast flow originates; an identifier or destination network address associated with each destination network endpoint on which the given active multicast flow terminates; and a maximum multicast flow bandwidth (e.g., expressed in gigabits per second (Gbps)) reflective of a maximum rate of data (e.g., network traffic) transfer to be expected by the given active multicast flow across any network link used thereby. Further, said information may be maintained on, and thus retrieved from, an information entry, corresponding to the given active multicast flow, of provisioned multicast flow information (described above) (see e.g., FIG. 4C).

In Step 464, the network topology map (derived in Step 460) is then filtered based on the maximum multicast flow bandwidth (obtained in Step 462). In one or more embodiments disclosed herein, filtering of the network topology map may, for example, entail: associating each edge, exhibited throughout the network topology map, with an available link bandwidth (i.e., an available amount of bandwidth (expressed in Gbps) that the network link, represented by the edge, can currently support); identifying a subset of the edges in the network topology map that each reflect an associated available link bandwidth that is less than the maximum multicast flow bandwidth; and omitting, from the network topology map, the identified subset of edges. Further, through said filtering, network link(s) (or network path segment(s)) that is/are unable to support the multicast flow, due to the high likeliness of network bandwidth oversubscription incurring thereon, may be removed from consideration. As a result of the removal of one or more edges (if any) from the network topology map, one or more nodes (also referred herein as island nodes) may become disconnected from a connected remainder of the network topology map. In such circumstances, filtering of the network topology map may further include omitting the island node(s) (or any disconnected subgraph(s)) therefrom as said island node(s) (or said disconnected subgraph(s)) may not be reached or used to connect a source network endpoint to one or many destination network endpoint(s). Moreover, following said filtering of the network topology map, a filtered network topology map may be obtained.

In Step 466, the filtered network topology map (obtained in Step 462) is subsequently traversed to identify a new or updated set of network paths (or collectively, a new or updated multicast distribution tree) for the given multicast flow. In one or more embodiments disclosed herein, each traversal of the filtered network topology map may originate at a source node, representative of the source network endpoint for the given active multicast flow, and may terminate at a destination node representative of a destination network endpoint for the given active multicast flow.

In one or more embodiments disclosed herein, as any multicast flow relies on a set of (or multiple) destination/receiver network endpoints, a traversal of the filtered network topology map may be performed (or otherwise attempted) for each destination/receiver network endpoint. Furthermore, the traversals may be performed sequentially or in parallel, and may be executed with or without constraints. By way of examples, the applied constraint(s) may include, but may not be limited to, the maximization of overlap in edges and/or nodes used amongst the multiple network paths to minimize multicast distribution tree complexity; the selection of an edge from two or more edge candidates, between any given pair of nodes, based on brute force policies or other selection criteria (e.g., shortest path(s) from the source node to the destination nodes), etc. Moreover, any traversal of the filtered network topology map may employ any existing graph or tree traversing algorithm (e.g., depth-first searching, breadth-first searching, etc.).

In Step 468, the given active multicast flow is edited with respect to its provisioning, configuration, or programming across at least a portion of the network. In one or more embodiments disclosed herein, editing of the given active multicast flow may be contingent on the new or updated multicast distribution tree (identified in Step 466) for the given active multicast flow. Further, editing of the given multicast flow may entail the generation and deliverance of multicast flow provisioning instructions, multicast flow editing instructions, or multicast flow removal instructions to each of at least a portion of the network devices forming the network. Specifically, multicast flow provisioning instructions may direct a network device (that had not been a part of the previous multicast distribution tree yet is a part of the new/updated multicast distribution tree) to participate in the given active multicast flow; multicast flow editing instructions may direct a network device (that had been a part of the previous multicast distribution tree and remains a part of the new/updated multicast distribution tree) to replace its existing multicast flow information with that reflective of the new/updated multicast distribution tree; and multicast flow removal instructions may direct a network device (that had been a part of the previous multicast distribution tree and is not a part of the new/updated multicast distribution tree) to remove its participation in the given active multicast flow.

In one or more embodiments disclosed herein, multicast flow provisioning instructions, directed to a given network device, may include, but may not be limited to: a tag indicating the instructions pertain to multicast flow provisioning; the source network address associated with the source network endpoint from which the given active multicast flow originates; a multicast destination group network address associated with a multicast destination group for the given active multicast flow, where member(s) of the multicast destination group includes each destination network endpoint on which the given active multicast flow terminates; an ingress or inbound physical network interface of the given network device pointing/leading to the source network endpoint based on the new or updated multicast distribution tree; and one or more egress or outbound physical network interfaces of the given network device pointing/leading to the destination network endpoint(s), respectively, based on the new or updated multicast distribution tree. Multicast flow provisioning instructions may include additional information without departing from the scope of the disclosure.

In one or more embodiments disclosed herein, multicast flow editing instructions, directed to a given network device, may include, but may not be limited to: a tag indicating the instructions pertain to multicast flow editing; the source network address associated with the source network endpoint from which the given active multicast flow originates; a multicast destination group network address associated with a multicast destination group for the given active multicast flow, where member(s) of the multicast destination group includes each destination network endpoint on which the given active multicast flow terminates; an ingress or inbound physical network interface of the given network device pointing/leading to the source network endpoint based on the new or updated multicast distribution tree; and one or more egress or outbound physical network interfaces of the given network device pointing/leading to the destination network endpoint(s), respectively, based on the new or updated multicast distribution tree. Multicast flow editing instructions may include additional information without departing from the scope of the disclosure.

In one or more embodiments disclosed herein, multicast flow removal instructions, directed to a given network device, may include, but may not be limited to: a tag indicating the instructions pertain to multicast flow removal; and a multicast destination group network address associated with a multicast destination group for the given active multicast flow, where member(s) of the multicast destination group includes each destination network endpoint on which the given active multicast flow terminates. The multicast destination group network address may be unique to the given active multicast flow. Further, multicast flow removal instructions may include additional information without departing from the scope of the disclosure.

In Step 470, the information entry, in the provisioned multicast flow information and corresponding to the given active multicast flow, is updated. That is, in one or more embodiments disclosed herein, updating the information entry may at least entail replacing the previous (or existing) multicast distribution tree (or branches thereof—i.e., set of network paths) with the new (or updated) multicast distribution tree (identified in Step 466) for the given active multicast flow.

Figure 5A:
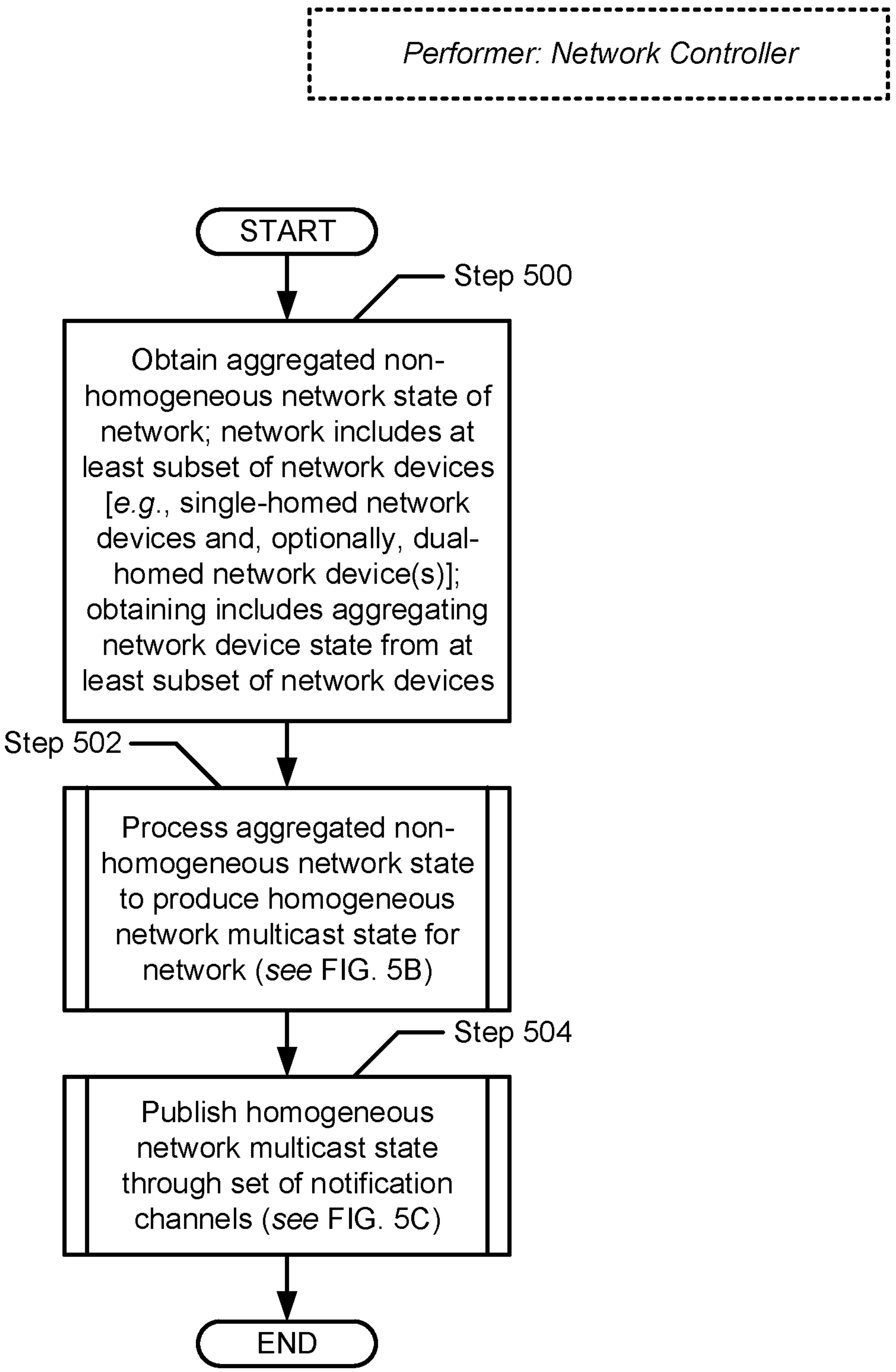
FIG. 5A shows a flowchart describing a method for centralized network multicast state publication in accordance with one or more embodiments disclosed herein.

FIG. 5A shows a flowchart describing a method for centralized network multicast state publication in accordance with one or more embodiments disclosed herein. The various steps outlined below may be performed by a network controller (see e.g., FIGS. 1 and 2B). Further, while the various steps in the flowchart are presented and described sequentially, one of ordinary skill will appreciate that some or all steps may be executed in different orders, may be combined or omitted, and some or all steps may be executed in parallel.

Turning to FIG. 5A, in Step 500, aggregated network state is obtained. In one or more embodiments disclosed herein, as used herein aggregated network state refers to the aggregation or collection of network device state from at least a subset (if not all) of the network devices in a network, which may be managed by the network controller. The network devices, from which network device state may be obtained, may include the single-homed network devices (described above) (see e.g., FIG. 1) operating within, and dual-homed network device(s) (described above) (see e.g., FIG. 1) operating at least within, the aforementioned network. Further, the obtained aggregated network state may be non-homogeneous (or non-uniform) throughout. That is, the various network device state, from which aggregated network state derives, may be formatted or may present state through different schemas. Each schema may be associated with a database version of a device state database (see e.g., FIG. 2B) that may be employed on a given network device. Accordingly, each said schema may also be referred herein as a database-specific state schema.

In Step 502, the aggregated non-homogeneous network state (obtained in Step 500) is processed. In one or more embodiments disclosed herein, said processing of the aggregated non-homogeneous network state may result in the production of homogeneous network multicast state. Details concerning the processing of aggregated non-homogeneous network state is further illustrated and described with respect to FIG. 5B, below.

In Step 504, the homogeneous network multicast state (produced in Step 502) is subsequently published. In one or more embodiments disclosed herein, publishing of the homogeneous network multicast state may utilized their conveyance or deliverance using one or more notification channels. Details concerning the publishing of homogeneous network multicast state is further illustrated and described with respect to FIG. 5C, below.

Figure 5B:
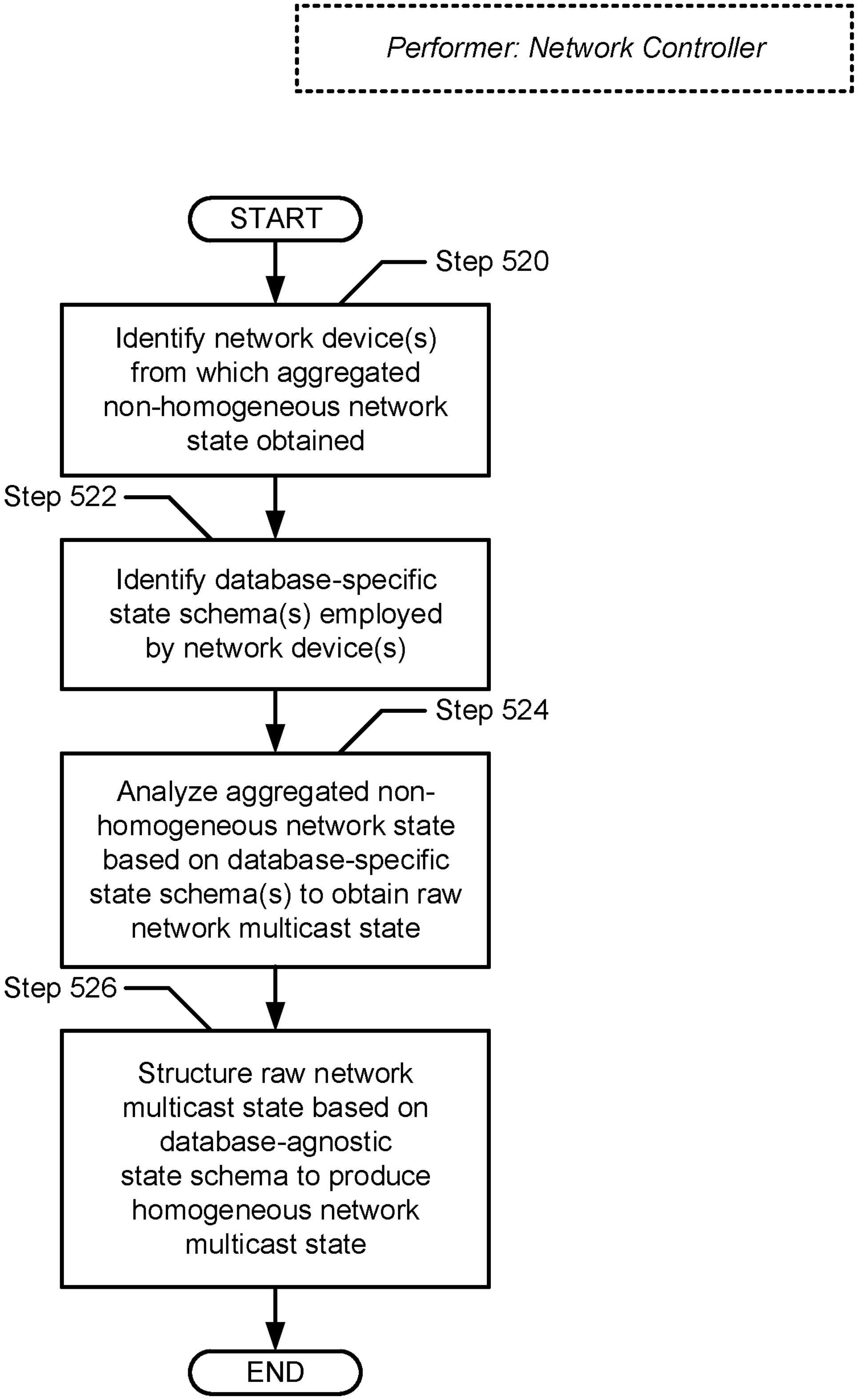
FIG. 5B shows a flowchart describing a method for producing homogeneous network multicast state in accordance with one or more embodiments disclosed herein.

FIG. 5B shows a flowchart describing a method for producing homogeneous network multicast state in accordance with one or more embodiments disclosed herein. The various steps outlined below may be performed by a network controller (see e.g., FIGS. 1 and 2B). Further, while the various steps in the flowchart are presented and described sequentially, one of ordinary skill will appreciate that some or all steps may be executed in different orders, may be combined or omitted, and some or all steps may be executed in parallel.

Turning to FIG. 5B, in Step 520, one or many network device(s), from which aggregated non-homogeneous network state (see e.g., FIG. 5A) is obtained, is/are identified. In one or more embodiments disclosed herein, identification of the network device(s) may, for example, entail: separation of each network device state from the obtained aggregated non-homogeneous network state; and determining, for each separated network device state, the network device associated therewith (e.g., by a unique identifier or network device network address associated with the network device that may be embedded within the separated network device state).

In Step 522, a database-specific state schema, for each network device (identified in Step 520), is identified. In one or more embodiments disclosed herein, each database-specific state schema may be associated with a database version of a device state database (see e.g., FIG. 2B) that may be employed on a given network device. Further, each database-specific state schema may format or may present state differently, in part or in whole, from other database-specific state schemas. In order to identify the database-specific state schema for any given network device, a database version of the device state database employed thereon may first be identified using metadata descriptive of the network device state (separated in Step 520) respective to the given network device.

In Step 524, the aggregated non-homogeneous network state is analyzed. Specifically, in one or more embodiments disclosed herein, for each network device (identified in Step 520), the database-specific state schema (identified in Step 522) respective to the network device may be used to analyze the network device state (separated in Step 520) respective to the network device. Through said analysis, raw network multicast state, at least in part, forming the network device state, may be obtained or extracted therefrom. The raw network multicast state may encompass unstructured data (e.g., data not conforming to a pre-defined model or schema) belonging to network multicasting pertinent parameters and/or contexts (e.g., network interface(s), active multicast flow(s), active multicast flow sender(s), active multicast flow receiver(s), network bandwidth availability and usage, device link(s), and endpoint link(s)).

In Step 526, the raw network multicast state (obtained in Step 524), and for each network device (identified in Step 520), is structured using a database-agnostic state schema. In one or more embodiments disclosed herein, the database-agnostic state schema may re-arrange the unstructured raw network multicast state using a pre-defined database version free conformity, which may guarantee that all network multicast state yielded therefrom, for any network device, becomes homogeneous (or uniform) throughout. Accordingly, structuring of the raw network multicast state in the aforementioned manner may produce homogeneous network multicast state.

Figure 5C:
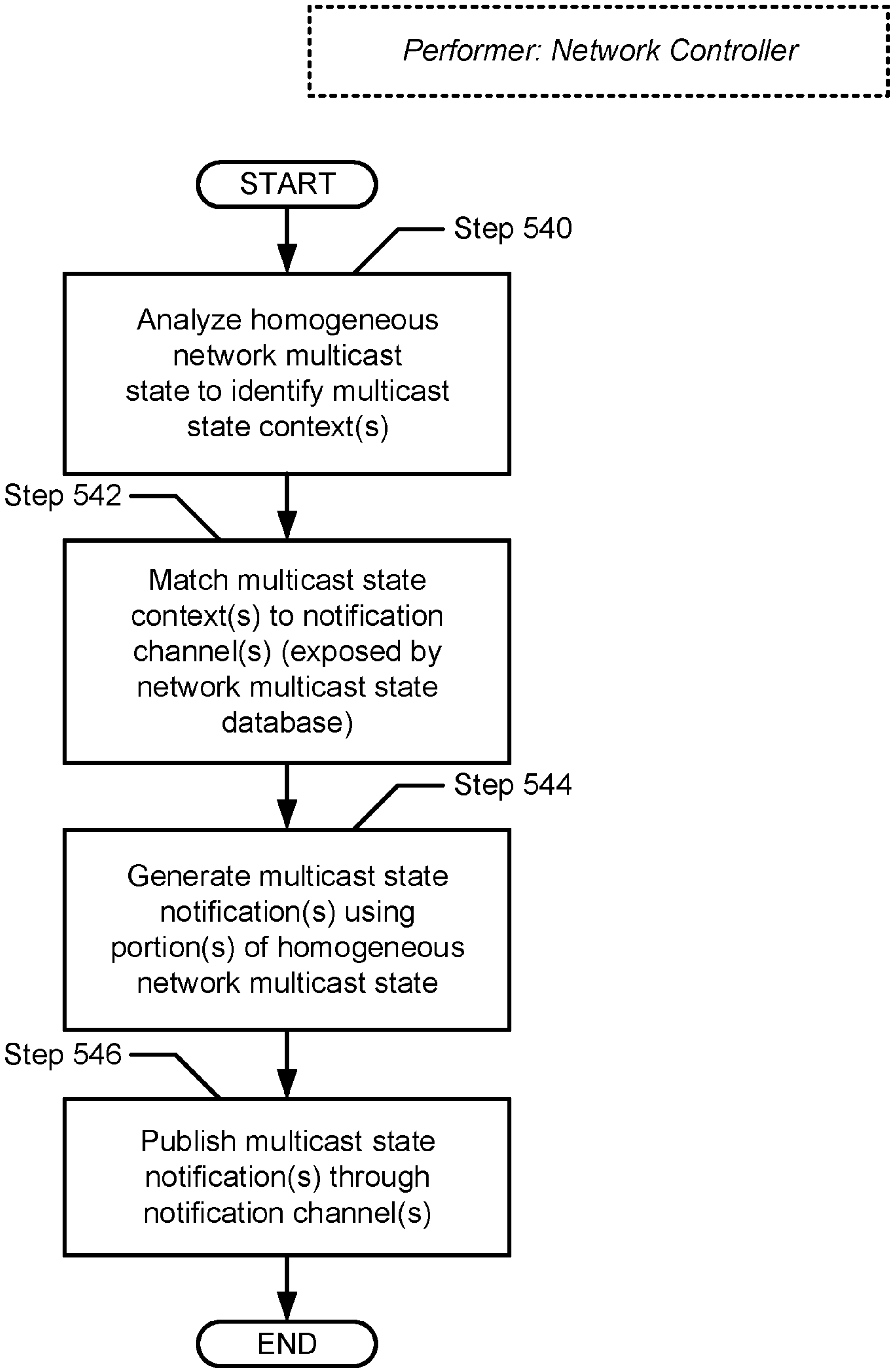
FIG. 5C shows a flowchart describing a method for publishing homogeneous network multicast state through notification channels in accordance with one or more embodiments disclosed herein.

FIG. 5C shows a flowchart describing a method for publishing homogeneous network multicast state through notification channels in accordance with one or more embodiments disclosed herein. The various steps outlined below may be performed by a network controller (see e.g., FIGS. 1 and 2B). Further, while the various steps in the flowchart are presented and described sequentially, one of ordinary skill will appreciate that some or all steps may be executed in different orders, may be combined or omitted, and some or all steps may be executed in parallel.

In Step 540, homogeneous network multicast state (see e.g., FIG. 5C), respective to each network device that contributed network device state to the aggregated non-homogeneous network state (also see e.g., FIG. 5C), is analyzed. In one or more embodiments disclosed herein, the analysis may identify one or more multicast state contexts associated with the homogeneous network multicast state. A multicast state context may refer to a particular topic or subject matter, within the umbrella of and thus pertinent to network multicasting, that is of interest to one or more embodiments disclosed herein. Further, any multicast state context may be identified, for example, using information describing the source(s) (e.g., dynamic network protocols and/or static route configuration) through which one or many multicast route(s) may be identified, selected, or programmed. Examples of the aforementioned dynamic network protocols may include, but may not be limited to, a protocol independent multicast (PIM) protocol, an Internet group management protocol (IGMP), a simple network management protocol (SNMP), a link layer discovery protocol (LLDP), a distance vector multicast routing protocol (DVMRP), a multicast open shortest path first (MOSPF) protocol, a multicast border gateway protocol (MBGP), a multicast source discovery protocol (MSDP), a multicast listener discovery (MLD) protocol, and a multicast registration protocol (MRP).

Examples of said network multicast state contexts, for any given network device, may include, but may not be limited to, network interface(s) on the given network device; active multicast flow(s) that have been provisioned, configured, or programmed on the given network device; active multicast flow sender(s) (e.g., source network endpoint(s)) associated with the active multicast flow(s) provisioned, configured, or programmed on the given network device; active multicast flow receiver(s) (e.g., destination network endpoint(s)) associated with the active multicast flow(s) provisioned, configured, or programmed on the given network device; network bandwidth availability and usage on the given network device; device link(s) (e.g., to other network device(s)) stemming from the given network device; and endpoint link(s) (e.g., to network endpoint(s)) stemming from the given network device. Further, the network multicast state contexts are not limited to the aforementioned specific examples.

In Step 542, the multicast state context(s) (identified in Step 540), respective to homogeneous network multicast state from each network device that contributed network device state to the aggregated non-homogeneous network state (see e.g., FIG. 5C), is/are each matched to a notification channel. In one or more embodiments disclosed herein, a set of notification channels may be exposed by a network multicast state database on the network controller (see e.g., FIG. 2A). Further, each notification channel may be associated with a given network multicast state context and, accordingly, serves as a conduit for delivering information pertaining to the given network multicast state context to one or many subscribing entities (e.g., the system controller (see e.g., FIG. 1)).

In Step 544, one or more multicast state notifications, respective to homogeneous network multicast state from each network device that contributed network device state to the aggregated non-homogeneous network state (see e.g., FIG. 5C), is/are generated. In one or more embodiments disclosed herein, each multicast state notification may include a portion of the homogeneous network multicast state that relates to a given multicast state context of the multicast state context(s) (identified in Step 540). For example, if the homogeneous network multicast state was found to disclose information relevant to active multicast flows and endpoint links respective to the network device, then a first multicast state notification (including a portion of the homogeneous network multicast state relating to active multicast flows) and a second multicast state notification (including another portion of the homogeneous network multicast state relating to endpoint links) may be generated.

In Step 546, the multicast state notification(s) (generated in Step 544), respective to homogeneous network multicast state from each network device that contributed network device state to the aggregated non-homogeneous network state (see e.g., FIG. 5C), is/are published through the notification channel(s) (matched in Step 542). Specifically, in one or more embodiments disclosed herein, each multicast state notification may pertain to a given multicast state context, and thus, delivered to subscribing entities of a notification channel that also pertains to the same given multicast state context.

Figure 6:
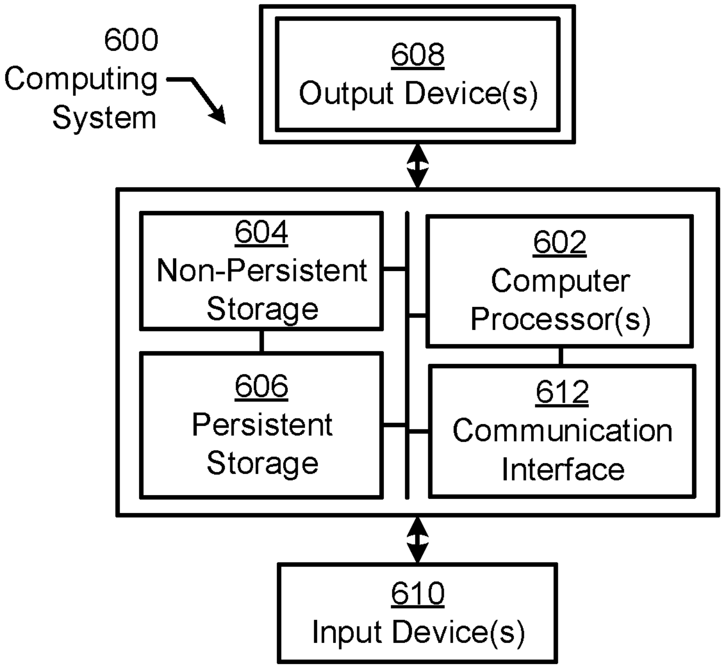
FIG. 6 shows an exemplary computing system in accordance with one or more embodiments disclosed herein.

FIG. 6 shows an exemplary computing system in accordance with one or more embodiments disclosed herein. The computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one or more embodiments disclosed herein, the computer processor(s) (602) may be an integrated circuit for processing instructions. For example, the computer processor(s) may be one or more cores or micro-cores of a central processing unit (CPU) and/or a graphics processing unit (GPU). The computing system (600) may also include one or more input devices (610), such as a touchscreen, keyboard, mouse, microphone, touchpad, electronic pen, or any other type of input device. Further, the communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

In one or more embodiments disclosed herein, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform one or more embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 7A:
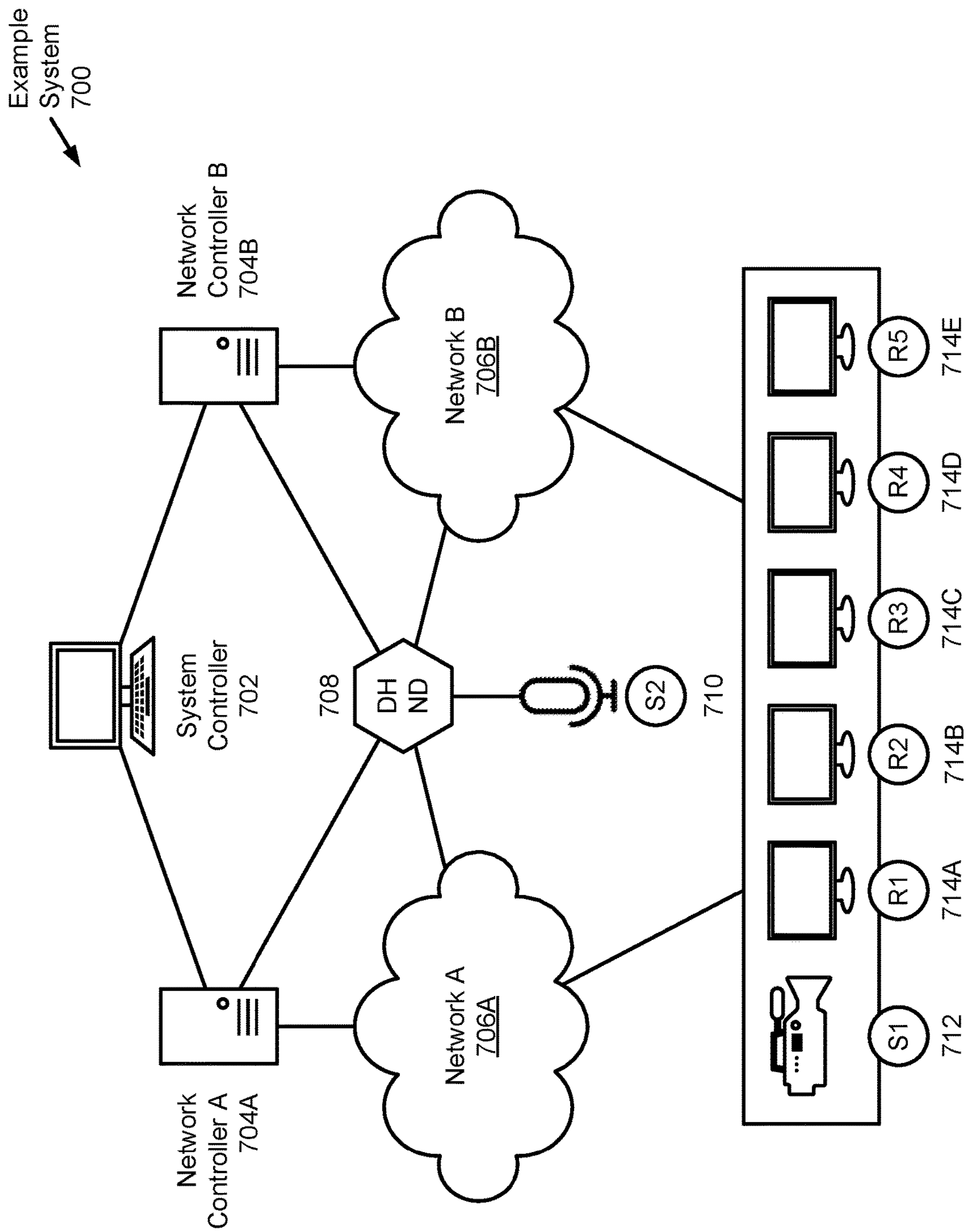
FIGS. 7A-7O shows exemplary scenarios in accordance with one or more embodiments disclosed herein.
Figure 7B:
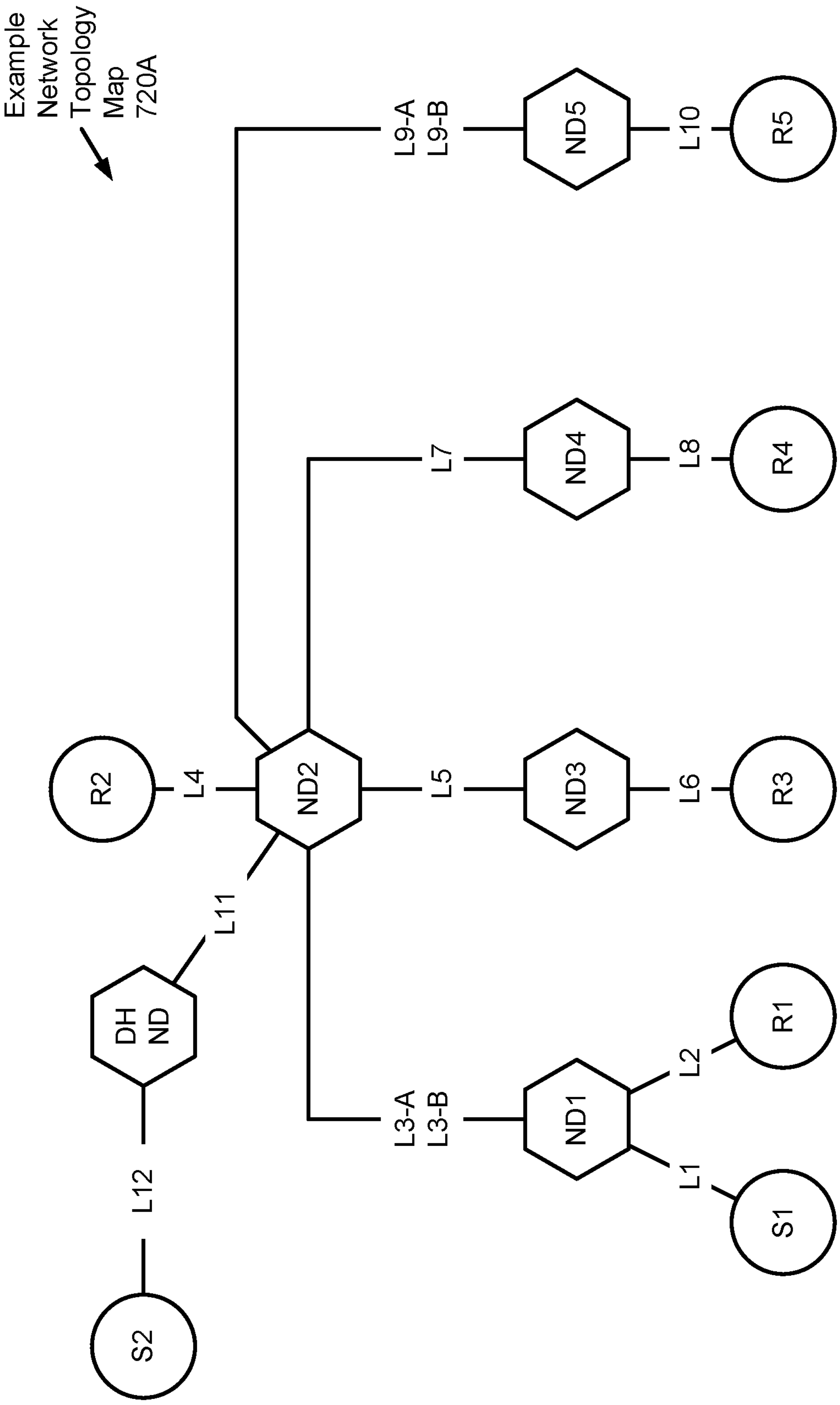
Figure 7C:
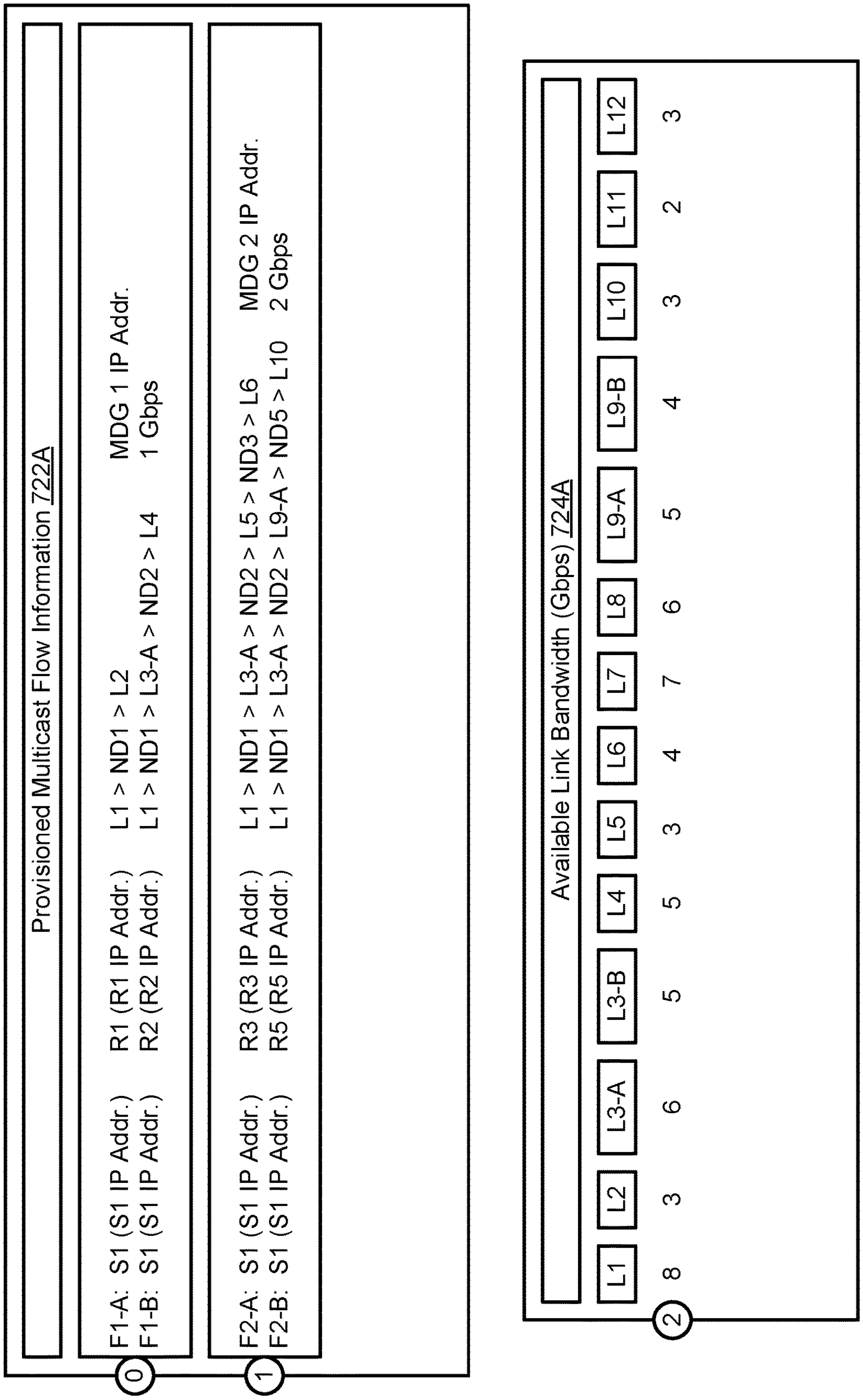
Figure 7D:
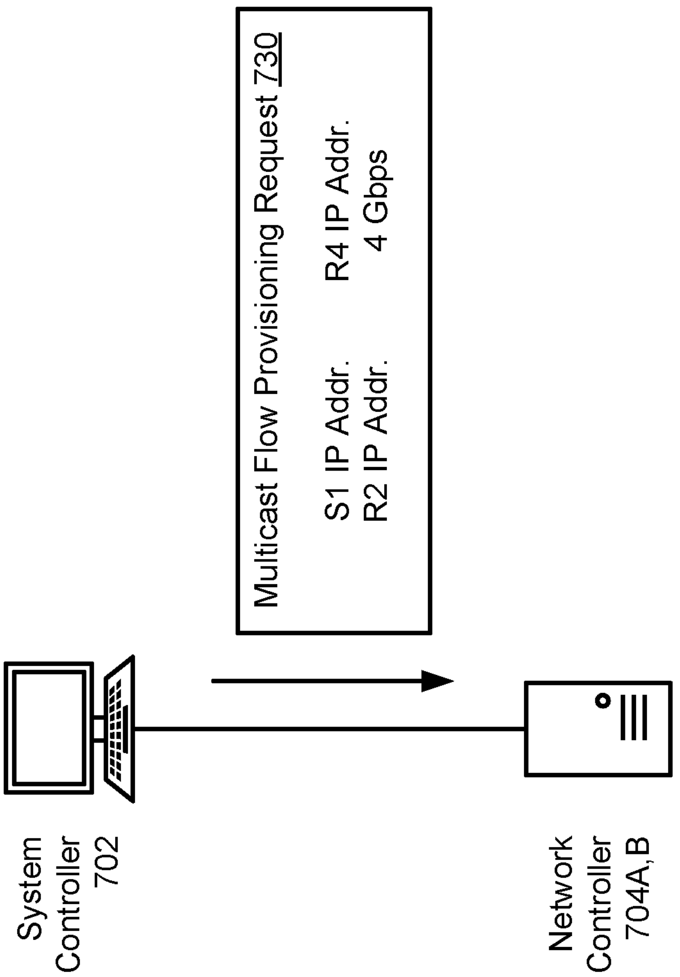
Figure 7E:
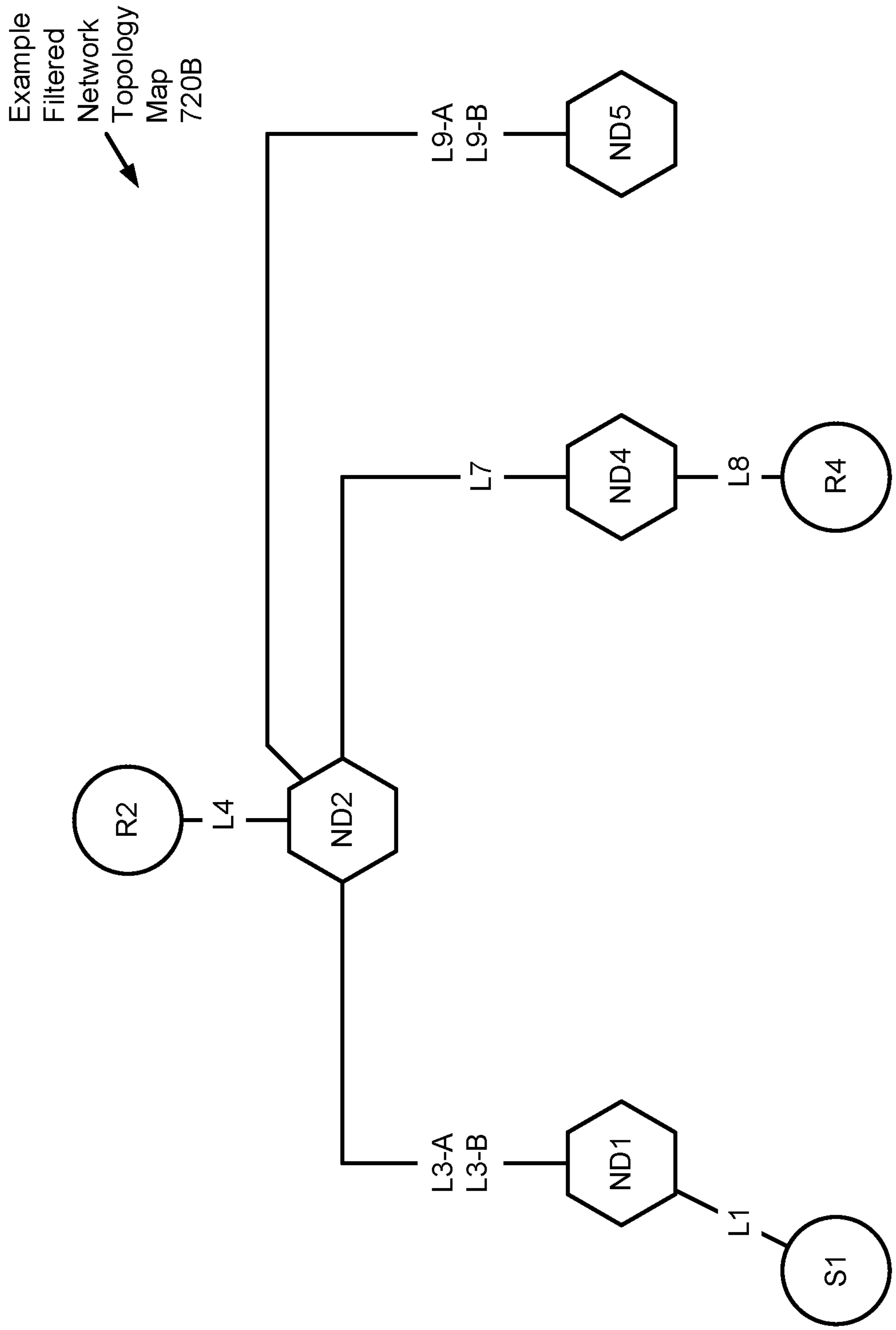
Figure 7E:
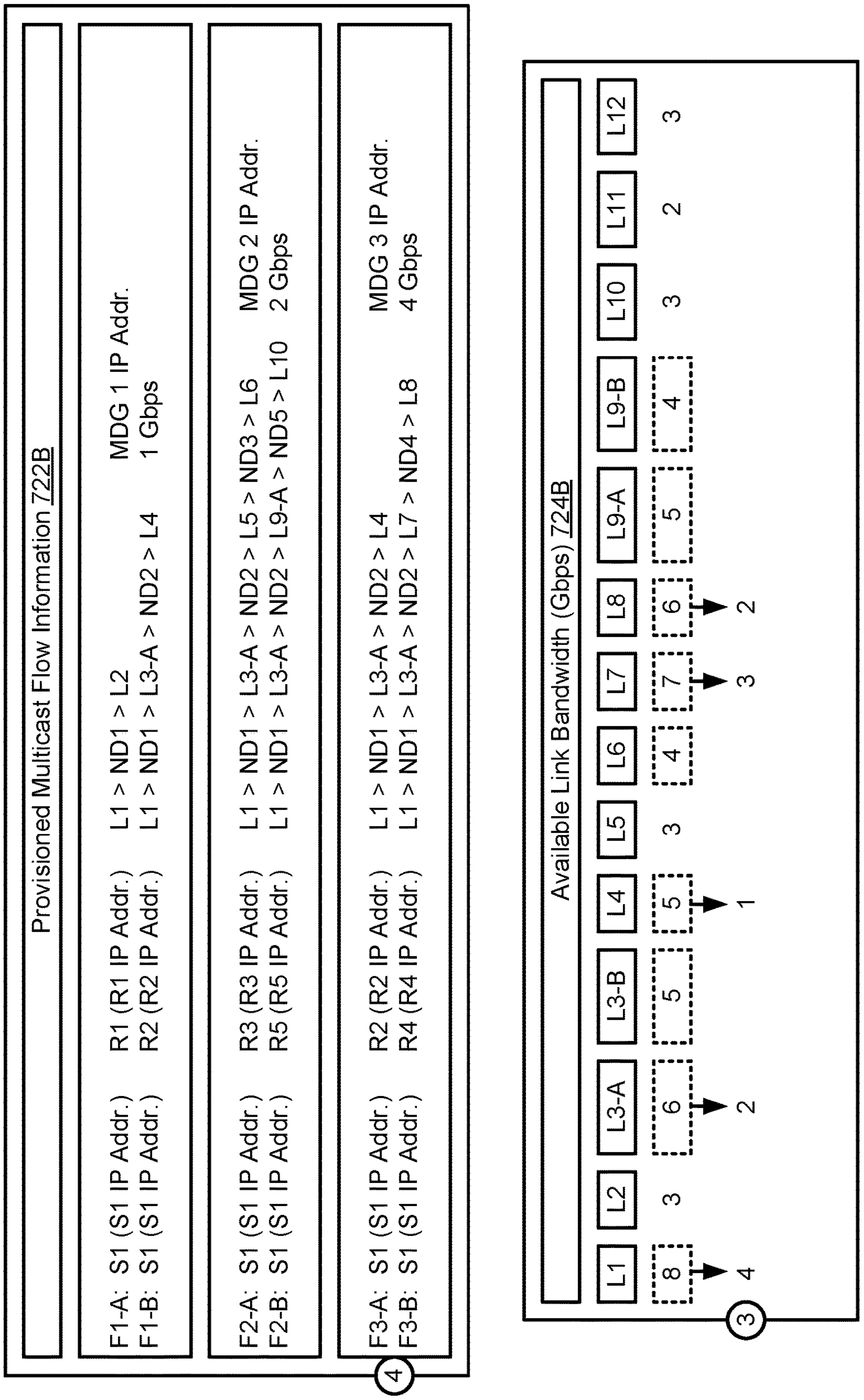
Figure 7G:
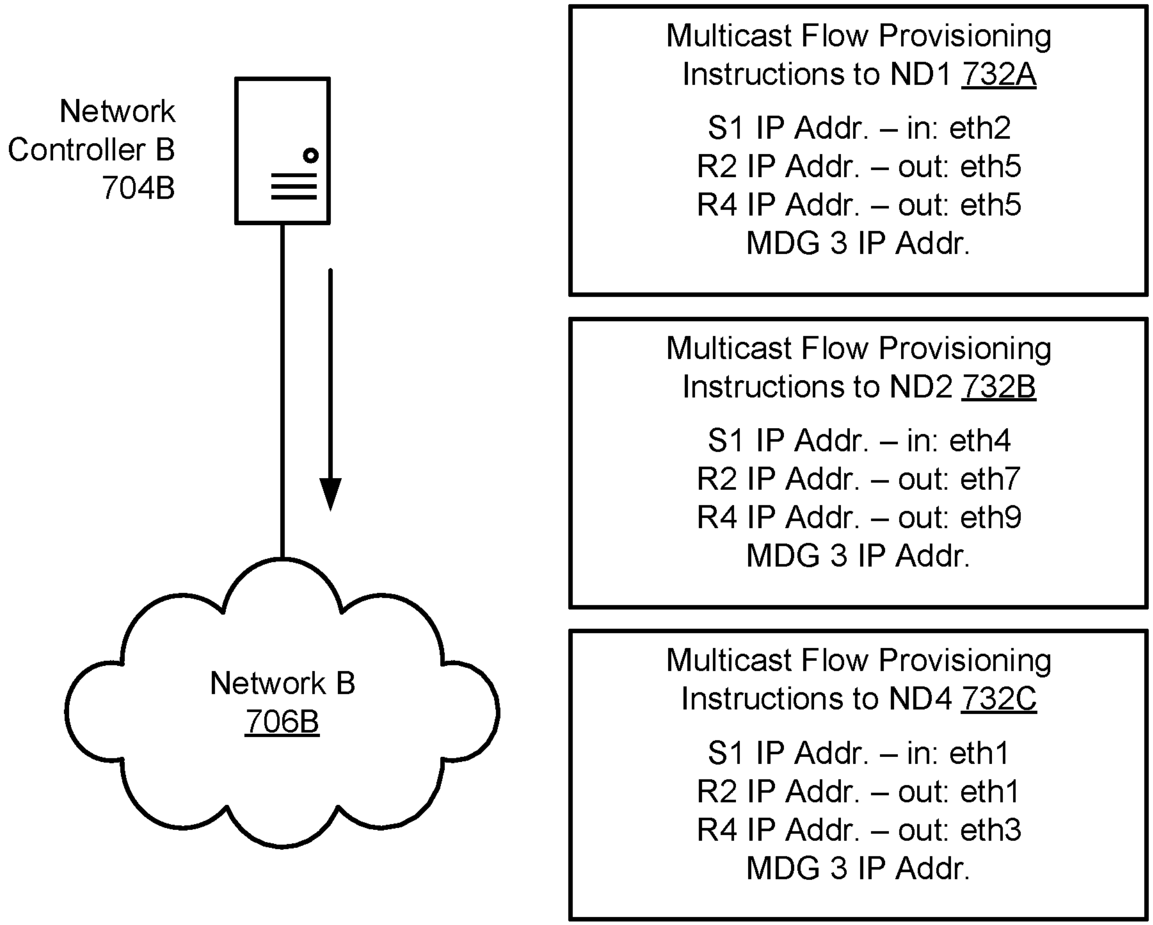
Figure 7H:
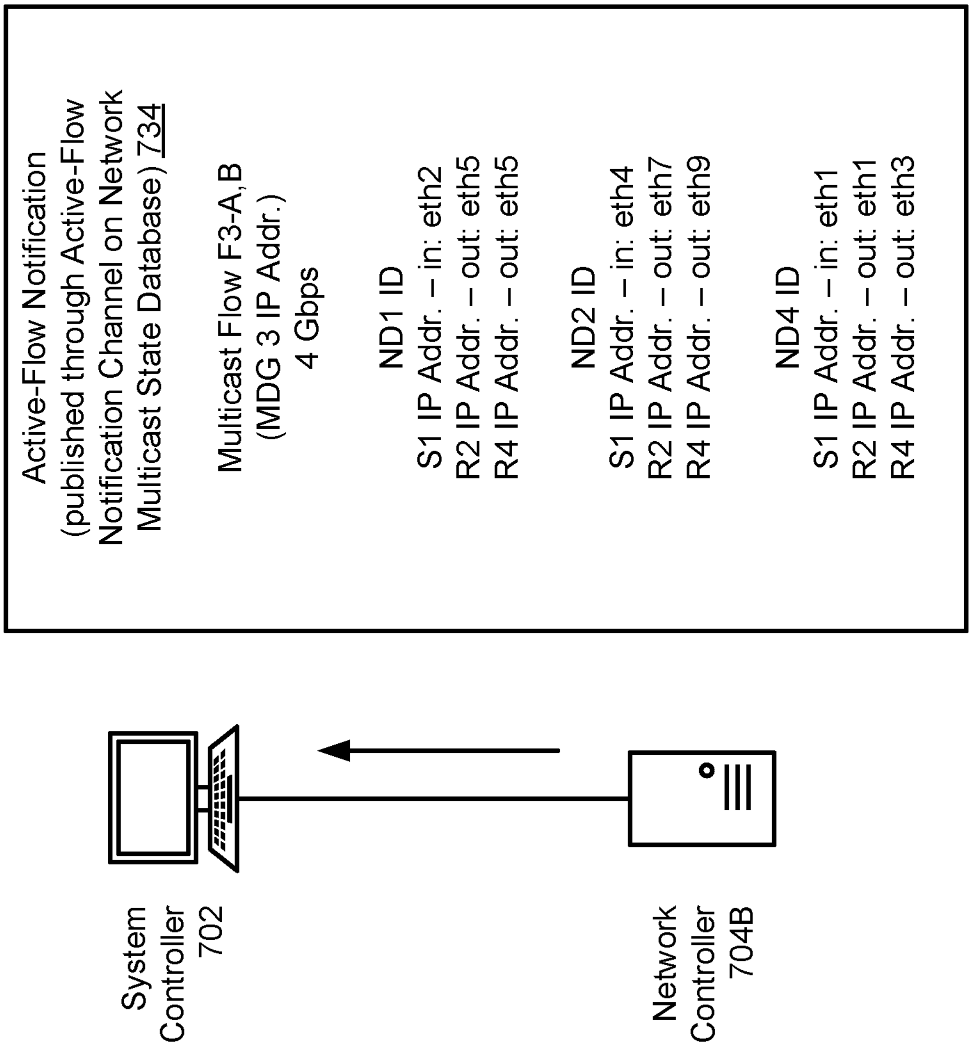
Figure 7I:
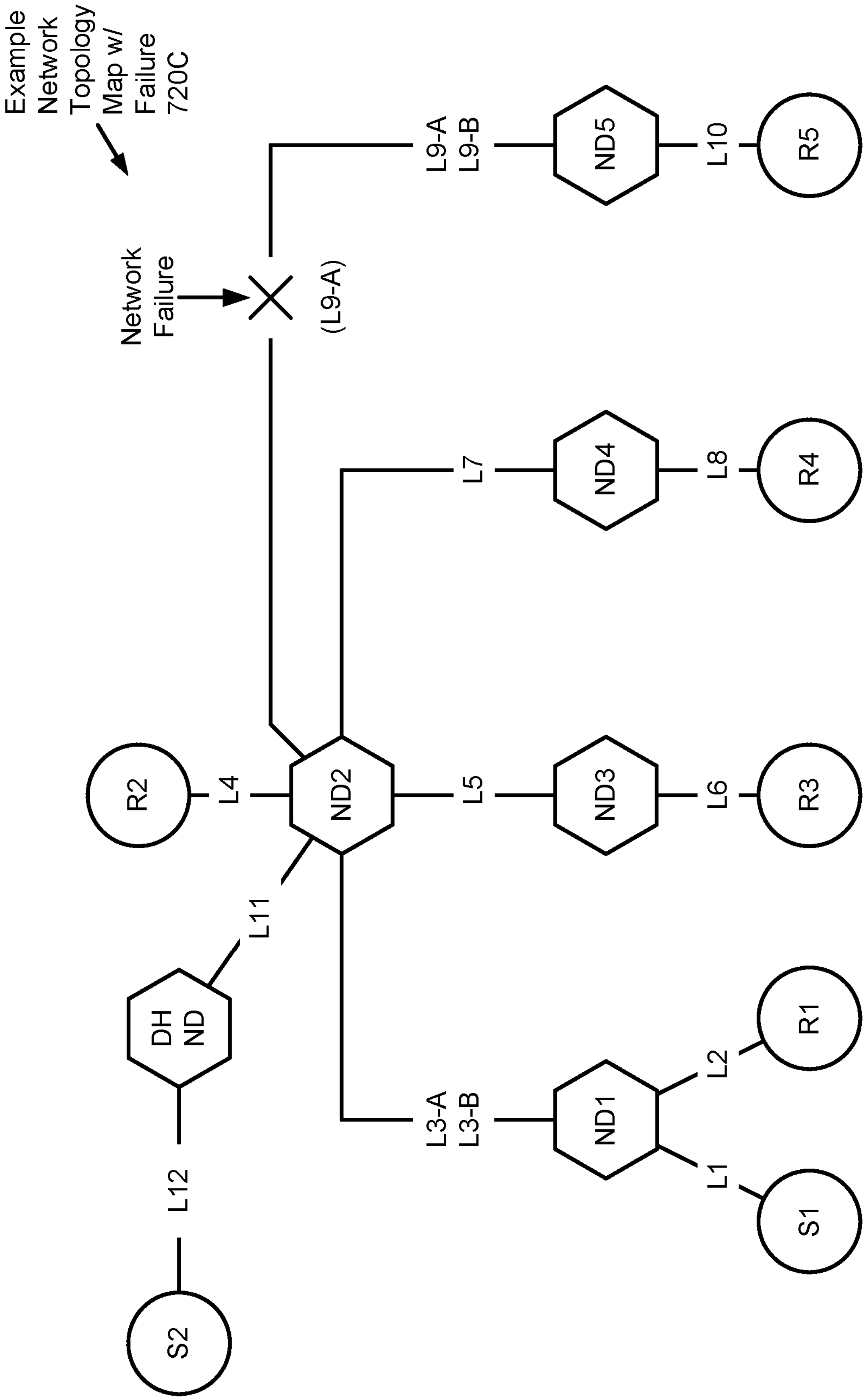
Figure 7J:
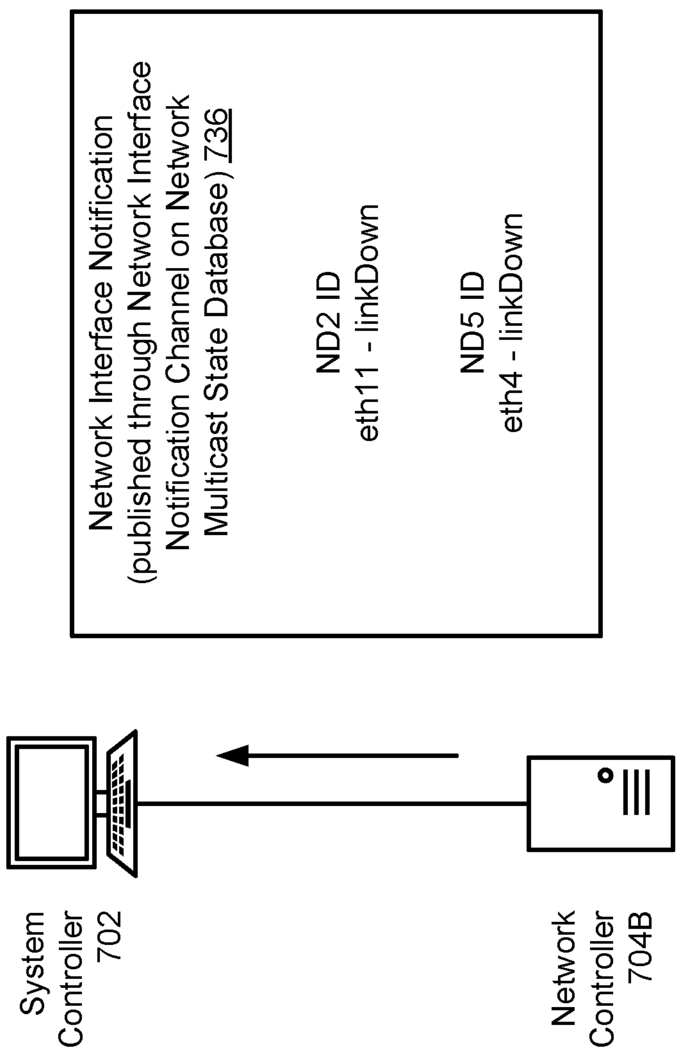
Figure 7K:
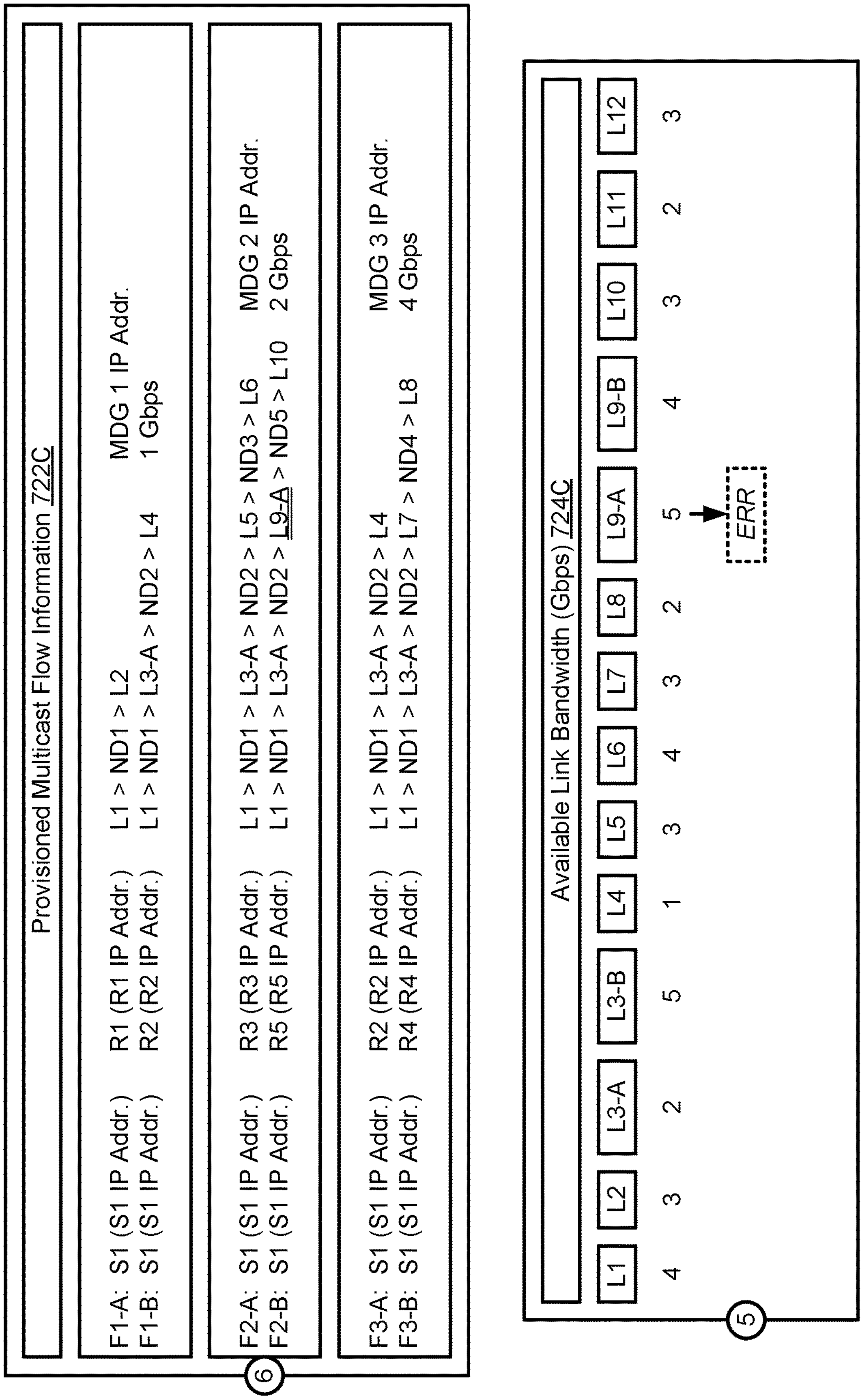
Figure 7L:
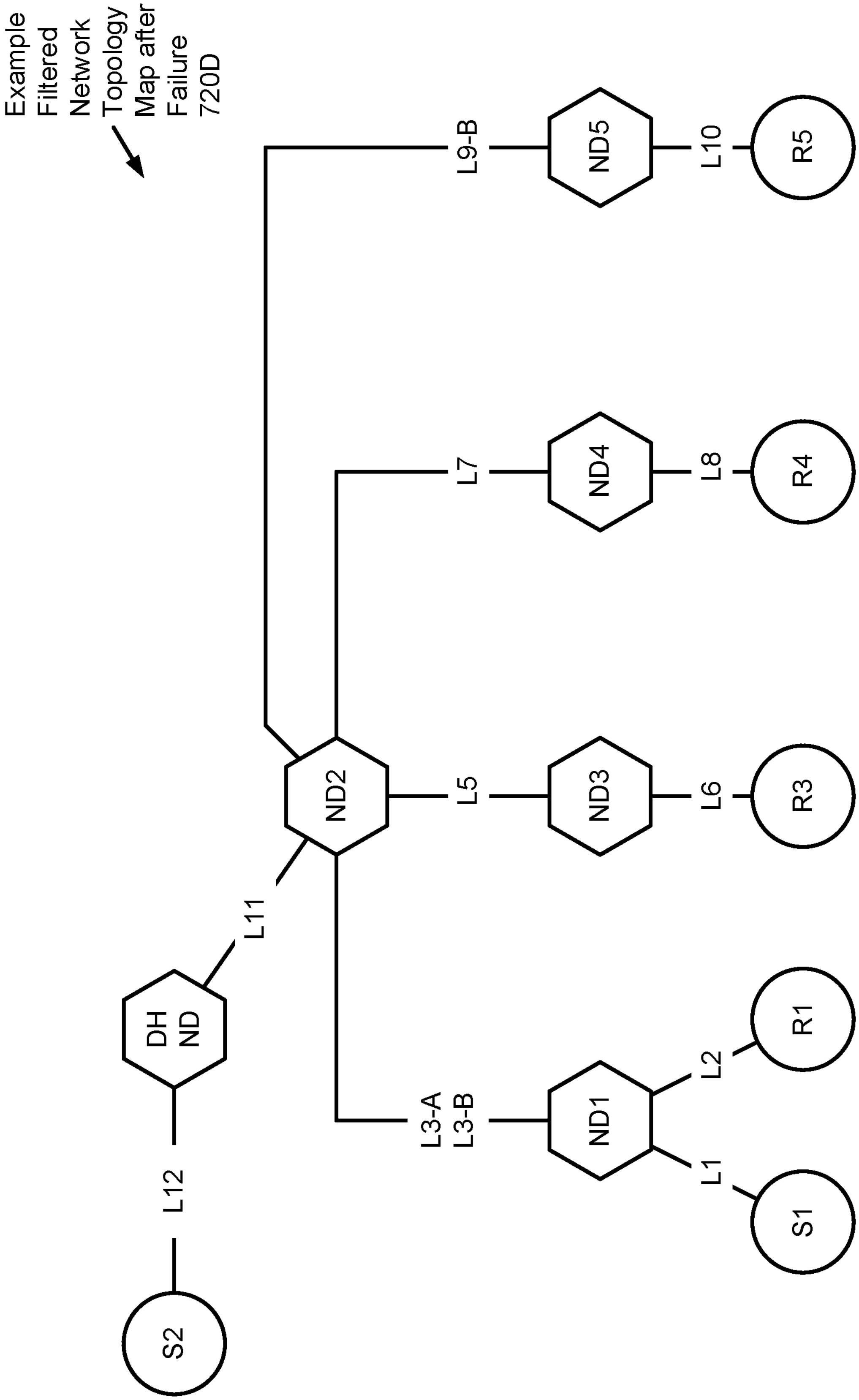
Figure 7M:
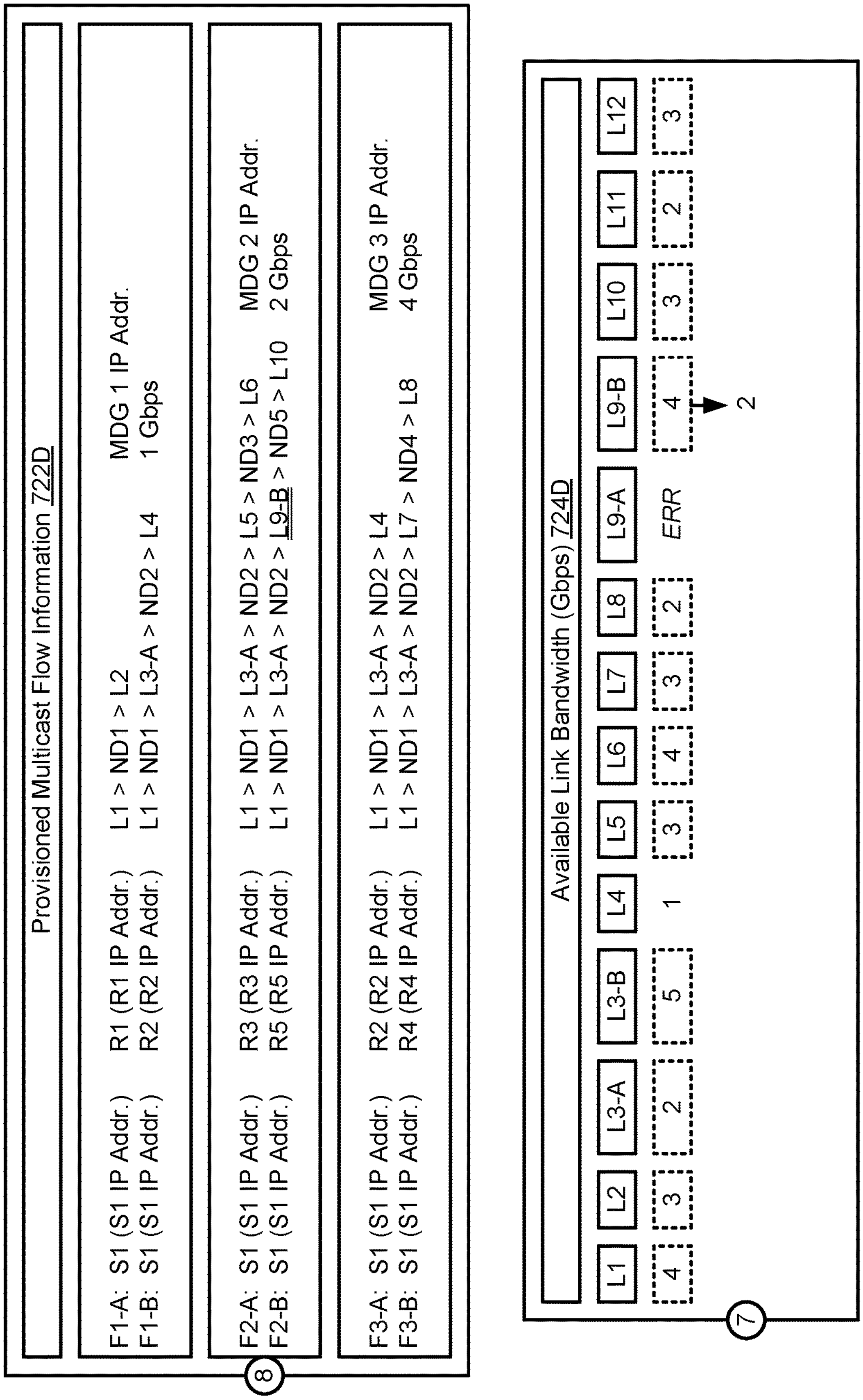
Figure 7N:
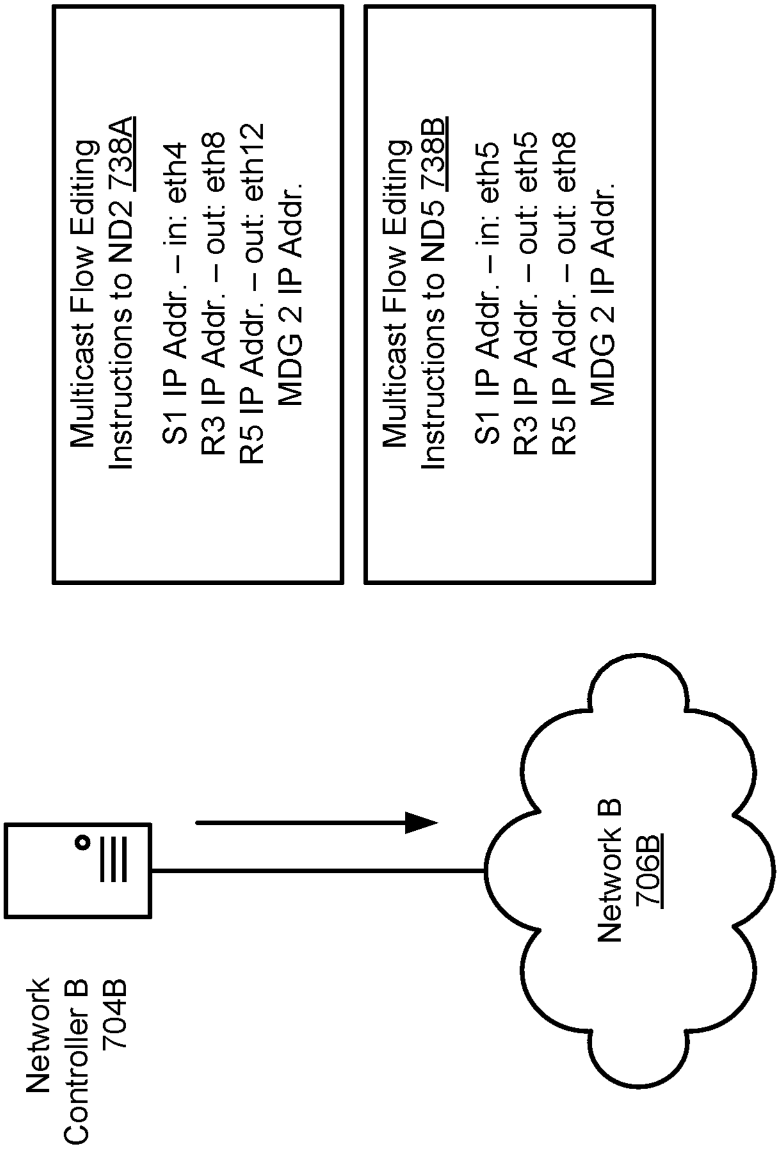
Figure 7O:
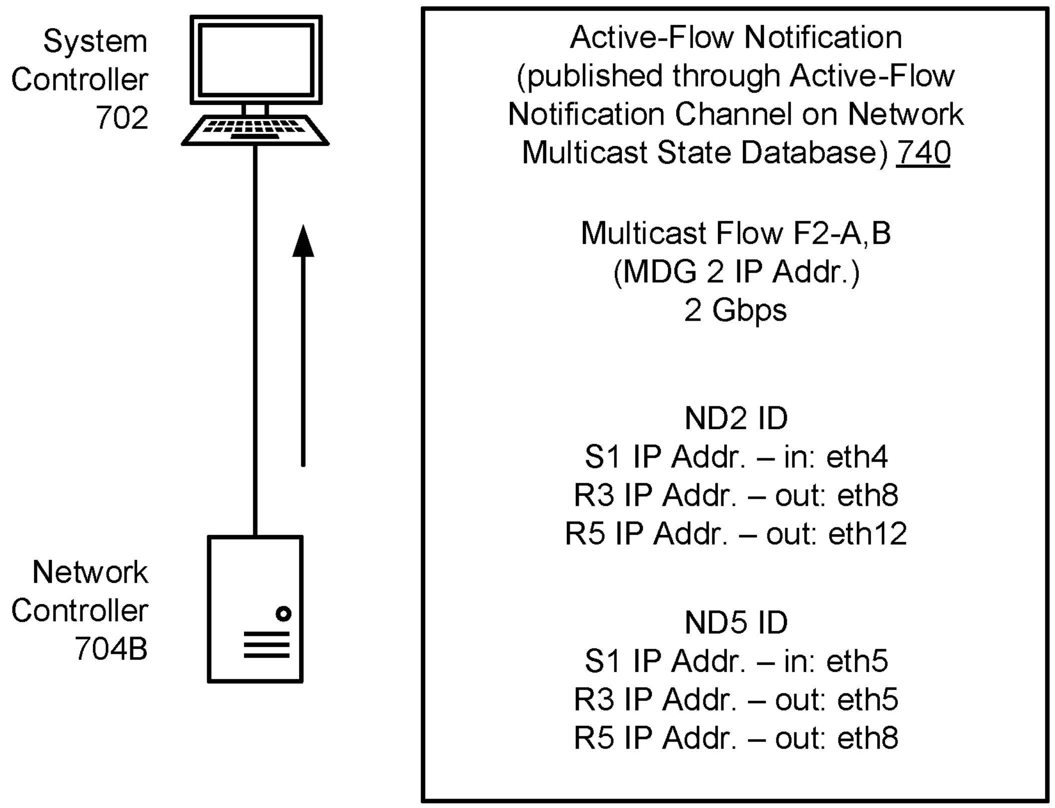

FIGS. 7A-7O show exemplary scenarios in accordance with one or more embodiments disclosed herein. The exemplary scenarios, illustrated through FIGS. 7A-7O and described below, are for explanatory purposes only and not intended to limit the scope of the disclosure.

Turning to FIG. 7A, consider the example system (700) portrayed thereon. The example system (700) includes a system controller (702) connected to two network controllers (704A, 704B). Each network controller (704A, 704B) then connects to a respective network of single-homed network devices (706A, 706B) and a dual-homed network device (708). Further, each network of single-homed network devices (706A, 706B) connects to a set of dual-homed network endpoints that include a first source network endpoint (S1) (712) and five destination (i.e., receiver) network endpoints (R1-R5) (714A-714E). Meanwhile the dual-homed network device (708) connects to a single-homed network endpoint serving as a second source network endpoint (S2) (710).

Turning to FIG. 7B, an example network topology map (720A), for any or each of the networks (706A, 706B) illustrated in FIG. 7A, is shown. The example network topology map (720A) includes a set of nodes interconnected by a set of edges. The circular nodes (labeled S1, S2, R1-R5) are each representative of a network endpoint, whereas the hexagonal nodes (labeled ND1-ND5 and DHND) are each representative of a network device. Further, network devices ND1-ND5 (not shown in FIG. 7A) are the network devices forming any or each of the networks (706A, 706B). Both networks (706A, 706B) are laid out in the same configuration for network redundancy purposes, though operate separately without knowledge that the other network exists. Moreover, there are the edges (labeled L1-L12) representative of the network links between pairs of network devices or between a network device and a network endpoint. Note that the edges (labeled L3-A, L3-B and L9-A, L9-B) are each indicative that two separate network links (i.e., two separate wired mediums) interconnect network device ND1 to network device ND2, and the latter to network device ND5, respectively. The remainder of the edges (labeled L1, L2, L4-L8, and L10-L12) are each indicative of a single network link (i.e., a single wired medium) between their respective network device(s) and/or network endpoint(s).

Turning to FIG. 7C, provisioned multicast flow information (722A) and an available link bandwidth table (724A), in their respective initial state, are illustrated. The provisioned multicast flow information (722A) includes two information entries (labeled respectively by numbered bubbles 0 and 1) (described below), which correspond to existing multicast flows previously provisioned on any or each of the networks (706A, 706B).

(0) A first information entry including multicast flow information describing a first multicast flow F1; descriptive information includes a first source network address (S1 IP Addr.) associated with first source network endpoint (S1) (712) from which the first multicast flow F1 originates, a first destination network address (R1 IP Addr.) associated with first destination network endpoint (R1) (714A) on which the first multicast flow F1 terminates, a second destination network address (R2 IP Addr.) associated with second destination network endpoint (R2) (714B) on which the first multicast flow F1 also terminates, a first multicast distribution tree branch (L1>ND1>L2) for first multicast flow F1 that connects first source network endpoint (S1) (712) to first destination network endpoint (R1) (714A) per the example network topology map (720A), a second multicast distribution tree branch (L1>ND1>L3-A>ND2>L4) for first multicast flow F1 that connects first source network endpoint (S1) (712) to second destination network endpoint (R2) (714B) per the example network topology map (720A), a first multicast destination group network address (MDG 1 IP Addr.) associated with a first multicast destination group uniquely assigned to the first multicast flow F1, where members of the first multicast destination group include first and second destination network endpoints (R1, R2) (714A, 714B), and a first maximum multicast flow bandwidth (1 Gbps) associated with the first multicast flow F1.

(1) A second information entry including multicast flow information describing a second multicast flow F2; descriptive information includes a first source network address (S1 IP Addr.) associated with first source network endpoint (S1) (712) from which the second multicast flow F2 originates, a third destination network address (R3 IP Addr.) associated with third destination network endpoint (R3) (714C) on which the second multicast flow F2 terminates, a fifth destination network address (R5 IP Addr.) associated with fifth destination network endpoint (R5) (714E) on which the second multicast flow F2 also terminates, a first multicast distribution tree branch (L1>ND1>L3-A>ND2>L5>ND3>L6) for second multicast flow F2 that connects first source network endpoint (S1) (712) to third destination network endpoint (R3) (714C) per the example network topology map (720A), a second multicast distribution tree branch (L1>ND1>L3-A>ND2>L9-A>ND5>L10) for second multicast flow F2 that connects first source network endpoint (S1) (712) to fifth destination network endpoint (R5) (714E) per the example network topology map (720A), a second multicast destination group network address (MDG 2 IP Addr.) associated with a second multicast destination group uniquely assigned to the second multicast flow F2, where members of the second multicast destination group include third and fifth destination network endpoints (R3, R5) (714C, 714E), and a second maximum multicast flow bandwidth (2 Gbps) associated with the second multicast flow F2.

The above-mentioned available link bandwidth table (724A) discloses the available network bandwidth (labeled by numbered bubble 2) (described below) that remain (following the provisioning of the above-mentioned two existing multicast flows) for each network link specified in the example network topology map (720A).

(2) Available network bandwidth (expressed in Gbps) remaining for each network link exhibited in the example network topology map (720A); in the numerical order (L1, L2, L3-A, L3-B, L4, L5, L6, L7, L8, L9-A, L9-B, L10, L11, and L12) shown, the respective available link bandwidths are: 8, 3, 6, 5, 5, 3, 4, 7, 6, 5, 4, 3, 2, and 3.

Turning to FIG. 7D, the system controller (702) submits a multicast flow provisioning request (730) to any or each of the network controllers (704A, 704B). The multicast flow provisioning request (730) may pertain to a third multicast flow F3, and specifies the following descriptive information: a first source network address (S1 IP Addr.) associated with first source network endpoint (S1) (712) from which the third multicast flow F3 is expected to originate, a second destination network address (R2 IP Addr.) associated with second destination network endpoint (R2) (714B) on which the third multicast flow F3 is expected to terminate, a fourth destination network address (R4 IP Addr.) associated with fourth destination network endpoint (R4) (714D) on which the third multicast flow F3 is also expected to terminate, and a third maximum multicast flow bandwidth (4 Gbps) associated with the third multicast flow F3.

Following embodiments disclosed herein, the network controller(s) (704A, 704B), in response to the received multicast flow provisioning request (730), proceed to identify a multicast distribution tree for the third multicast flow F3. To that end, a network topology map (720A) is derived, the network topology map (720A) is filtered based on the third maximum multicast flow bandwidth to obtain a filtered network topology map, and the filtered network topology map is subsequently traversed from a source node representative of the first source network endpoint (S1) (712) to each of a pair of destination nodes representative of the second and fourth destination network endpoints (R2, R4) (714B, 714D), respectively.

Turning to FIG. 7E, the above-mentioned filtered network topology map (720B) is shown. Unlike the network topology map (720A), the filtered network topology map (720B) includes a subset of the set of nodes, as well as a subset of the set of edges, reflected in the network topology map (720A). The subset of edges, representative of network links L1, L3-A, L3-B, L4, L7, L8, L9-A, and L9-B, each have an available link bandwidth that matches or exceeds the third maximum multicast flow bandwidth associated with the third multicast flow F3. Further, the subset of the set of nodes—representative of the source network endpoint (S1) (712), the second and fourth destination network endpoints (R2, R4) (714B, 714E), and network devices ND1, ND2, ND4, and ND5—reflect nodes that remain interconnected by the subset of edges.

Turning to FIG. 7F, provisioned multicast flow information (722B) and an available link bandwidth table (724B), in their respective updated state, are illustrated. The available link bandwidth table (724B) reflects the filtering and selection of network links (labeled by numbered bubble 3) (described below) towards obtaining the example filtered network topology map (720B).

(3) Based on the maximum multicast flow bandwidth (4 Gbps) for the third multicast flow F3, network links filtered out of consideration include L2, L5, and L10-L12 where each has an available link bandwidth that falls short of the aforementioned maximum multicast flow bandwidth; those network links (e.g., L1, L3-A, L3-B, L6-L8, L9-A, and L9-B) that remain are representative of network links that can support the maximum multicast flow bandwidth for the third multicast flow F3 without incurring bandwidth oversubscription; further, of the remaining network links, a subset (e.g., L1, L3-A, L4, L7, and L8) are selected while traversing the filtered network topology map (720B) to identify network paths (or multicast distribution tree branches) for the third multicast flow F3; later, the available link bandwidth for each network link of the selected subset is updated to account for consumption of at least a portion of the available link bandwidth due to an intended usage of the network link to, at least in part, implement the third multicast flow F3.

Thereafter, the provisioned multicast flow information (722B) expands to include an additional information entry (labeled by numbered bubble 4) (described below), which corresponds to the new multicast flow F3 provisioned on any or each of the networks (706A, 706B).

(4) A third information entry including multicast flow information describing the third multicast flow F3; descriptive information includes a first source network address (S1 IP Addr.) associated with first source network endpoint (S1) (712) from which the third multicast flow F3 originates, a second destination network address (R2 IP Addr.) associated with second destination network endpoint (R2) (714B) on which the third multicast flow F3 terminates, a fourth destination network address (R4 IP Addr.) associated with fourth destination network endpoint (R4) (714D) on which the third multicast flow F3 also terminates, a first multicast distribution tree branch (L1>ND1>L3-A>ND2>L4) for third multicast flow F3 that connects first source network endpoint (S1) (712) to second destination network endpoint (R2) (714B) per the example filtered network topology map (720B), a second multicast distribution tree branch (L1>ND1>L3-A>ND2>L7>ND4>L8) for third multicast flow F3 that connects first source network endpoint (S1) (712) to fourth destination network endpoint (R4) (714D) per the example filtered network topology map (720B), a third multicast destination group network address (MDG 3 IP Addr.) associated with a third multicast destination group uniquely assigned to the third multicast flow F3, where members of the third multicast destination group include second and fourth destination network endpoints (R2, R4) (714B, 714D), and a third maximum multicast flow bandwidth (4 Gbps) associated with the third multicast flow F3.

Turning to FIG. 7G, a network controller (704B) directs multicast flow provisioning instructions (732A, 732B, 732C) to network devices ND1, ND2, and ND4, respectively. These three network devices are identified as unique network devices that are situated along the multicast distribution tree branches (see e.g., FIG. 7F) for the third multicast flow F3. Further, each set of multicast flow provisioning instructions (732A, 732B, 732C) generally specify: a tag (not shown) indicating the instructions pertain to multicast flow provisioning; the first source network address (S1 IP Addr.) associated with the first source network endpoint (S1) (712); an ingress or inbound physical network interface (e.g., eth2 for ND1, eth4 for ND2, and eth1 for ND4) on the network device that leads or points to the first source network endpoint (S1) (712) per the example filtered network topology map (720B); the third multicast destination group network address (MDG 3 IP Addr.) associated with the third multicast destination group uniquely assigned to the third multicast flow F3, where members of the third multicast destination group include the second and fourth destination network endpoints (R2, R4) (714B, 714D); an egress or outbound physical network interface (e.g., eth5 for ND1, eth7 for ND2, and eth1 for ND4) on the network device that leads or points to the second destination network endpoint (R2) (714B) per the example filtered network topology map (720B); and the aforementioned or another egress or outbound physical network interface (e.g., eth5 for ND1, eth9 for ND2, and eth3 for ND4) on the network device that leads or points to the fourth destination network endpoint (R4) (714D) per the example filtered network topology map (720B).

Turning to FIG. 7H, network devices ND1, ND2, and ND4 each implement at least a portion of multicast flow F3 based on their respective received multicast flow provisioning instructions (732A, 732B, 732C). Further, said implementation leads to change(s) in their respective network device state, which synchronizes with (and thus aggregates as new aggregated non-homogeneous network state stored in) a network state database (see e.g., FIG. 2B) on the network controller (704B). The network controller (704B) subsequently processes the new aggregated non-homogeneous network state to produce homogeneous network multicast state that relates to an active-flow(s) multicast state context. Accordingly, the network controller (704B) generates multicast state notification(s) (734) incorporating the homogeneous network multicast state, or more specifically, a combination of the information pertaining to multicast flow F3 presented in the submitted multicast flow provisioning request (730) (see e.g., FIG. 7D) and delivered through the sets of multicast flow provisioning instructions (732A, 732B, 732C) (see e.g., FIG. 7G). Following their generation, the multicast state notification(s) (734) is/are published through a notification channel matching the active-flow(s) multicast state context, where said multicast state notification(s) (734) is/are immediately consumed by subscribing entities (e.g., the system controller (702)) of the aforementioned notification channel.

Turning to FIG. 7I, an example network topology map reflecting a network failure (720C) is presented. The network failure is detected based on a correlation of change(s) to network device state, for at least a subset (if not all) network devices forming the network (706B), with an expected network device state for the at least subset (if not all) network devices. The aforementioned change(s) to network device state is/are associated with network devices ND2 and ND5, where the former submits that the network link (L9-A) coupled with its eth11 physical network interface is down, and where the latter submits that the network link (L9-A) coupled with its eth4 physical network interface is down. Based on these submitted change(s) to network device state belonging to network devices ND2 and ND5, the network failure is discovered to be a network link failure that maps to network link L9-A between network devices ND2 and ND5.

Turning to FIG. 7J, the change(s) to network device state (see e.g., FIG. 7I) (i.e., aggregated non-homogeneous network state), belonging to network devices ND2 and ND5, is/are processed by the network controller (704B) to produce homogeneous network multicast state in accordance with embodiments disclosed herein. The homogeneous network multicast state is identified as relating to a network interface(s) multicast state context. Accordingly, the network controller (704B) generates multicast state notification(s) (736) incorporating the homogeneous network multicast state, or more specifically, relays that a network link, coupled to physical network interface eth11 on ND2 and physical network interface eth4 on ND5, is down. Following their generation, the multicast state notification(s) (736) is/are published through a notification channel matching the network interface(s) multicast state context, where said multicast state notification(s) (736) is/are immediately consumed by subscribing entities (e.g., the system controller (702)) of the aforementioned notification channel.

Turning to FIG. 7K, provisioned multicast flow information (722C) and an available link bandwidth table (724C), in their respective updated state, are illustrated. The available link bandwidth table (724C) reflects the detection of the network failure (labeled by numbered bubble 5) (described below).

(5) Based on the change(s) to network devices state (see e.g., FIG. 7I), belonging to network devices ND2 and ND5, the network failure is discovered to be a network link failure that maps to network link L9-A between network devices ND2 and ND5; the available link bandwidth respective to network link L9-A, tracked in the available link bandwidth table (724C), accordingly, alters to display an error (ERR) rather than a numerical value.

Meanwhile, across the provisioned multicast flow information (722C), a search (labeled by numbered bubble 6) (described below) is performed using an identifier (e.g., L9-A) for network link L9-A mapped to the network failure.

(6) As a result of the above-mentioned search, the second information entry is identified as it is the sole information entry that specifies the identifier (e.g., L9-A) for network link L9-A within the multicast distribution tree branches disclosed therein; further, because the second information entry corresponds to the second multicast flow F2, the second multicast flow F2 is deemed impacted by the network failure; steps to restore the second multicast flow F2 proceed.

Turning to FIG. 7L, an example filtered network topology map (720D) that omits network link L9-A (mapped to the network failure) is conveyed. Similar to the previous example filtered network topology map (720B) (see e.g., FIG. 7E), the present example filtered network topology map (720D) includes a subset of the set of nodes, as well as a subset of the set of edges, exhibited in the original example network topology map (720A) (see e.g., FIG. 7B). The subset of the set of edges, representative of network links L1, L2, L3-A, L3-B, L5, L6, L7, L8, L9-B, L10, L11, and L12 each have an available link bandwidth that matches or exceeds the second maximum multicast flow bandwidth (2 Gbps) associated with the second multicast flow F2 (which has been impacted by the network failure). Further, the subset of the set of nodes—representative of the first source network endpoint (S1) (712), the second source network endpoint (S2) (710), four of the five destination network endpoints (R1, R3, R4, R5) (714A, 714C, 714D, 714E), the dual-homed network device (DHND) (708), and network devices ND1, ND2, ND3, ND4, and ND5—reflect nodes that remain interconnected by the subset of the set of edges. Note also that the edge (now labeled L9-B) that had previously been indicative of two separate network links (i.e., two separate wired mediums) has been updated to alternatively indicate a single network link (i.e., a single wired medium) due to the network failure mapped to network link L9-A.

Turning to FIG. 7M, provisioned multicast flow information (722D) and an available link bandwidth table (724D), in their respective updated state, are illustrated. The available link bandwidth table (724D) reflects the filtering and selection of a network link (labeled by numbered bubble 7) (described below) towards obtaining the example filtered network topology map (720D) (see e.g., FIG. 7L).

(7) Based on the maximum multicast flow bandwidth (2 Gbps) for the second multicast flow F2 (impacted by the network failure), network links filtered out of consideration include L4 and obviously L9-A where the former has an available link bandwidth that falls short of the aforementioned maximum multicast flow bandwidth, while the latter is inoperable; those network links (e.g., L1, L2, L3-A, L3-B, L5-L8, L9-B, and L10-L12) that remain are representative of network links that can support the maximum multicast flow bandwidth for the second multicast flow F2 without incurring bandwidth oversubscription; further, of the remaining network links, a subset (e.g., L9-B) is selected while traversing the example filtered network topology map (720D) to identify network paths (or multicast distribution tree branches) for the second multicast flow F2 that circumvents the network failure; later, the available link bandwidth for the selected network link L9-B (which may serve as a substitute for inoperable network link L9-A) is updated to account for consumption of at least a portion of the available link bandwidth due to an intended usage of the selected network link to, at least in part, restore the second multicast flow F2 (i.e., L9-B available link bandwidth=4 Gbps; second multicast flow F2 bandwidth consumption=2 Gbps; therefore, new L9-B available link bandwidth=4 Gbps−2 Gbps=2 Gbps).

Thereafter, the provisioned multicast flow information (722D) is updated (labeled by numbered bubble 8) (described below).

(8) The second information entry, respective to the second multicast flow F2 (which had been impacted by the network failure), is edited to incorporate an updated second multicast distribution tree branch (L1>ND1>L3-A>ND2>L9-B>ND5>L10) that circumvents inoperable network link L9-A (via network link L9-B instead) and once again connects the first source network endpoint (S1) (712) to the fifth destination network endpoint (R5) (714E).

Turning to FIG. 7N, the network controller (704B) directs multicast flow editing instructions (738A, 738B) to network devices ND2 and ND5, respectively. These two network devices are identified as those necessary to minimally effect the change(s) (e.g., usage of network link L9-B in place of inoperable network link L9-A) to the second multicast distribution tree branch for, and in order to restore, the second multicast flow F2. Further, each set of multicast flow editing instructions (738A, 738B) generally specify: a tag (not shown) indicating the instructions pertain to multicast flow editing; the first source network address (S1 IP Addr.) associated with the first source network endpoint (S1) (712); an ingress or inbound physical network interface (e.g., eth4 for ND2 and eth5 for ND5) on the network device that leads or points to the first source network endpoint (S1) (712) per the example filtered network topology map (720D); the second multicast destination group network address (MDG 2 IP Addr.) associated with the second multicast destination group uniquely assigned to the second multicast flow F2, where members of the second multicast destination group include the third and fifth destination network endpoints (R3, R5) (714C, 714E); an egress or outbound physical network interface (e.g., eth8 for ND2 and eth5 for ND5) on the network device that leads or points to the third destination network endpoint (R3) (714C) per the example filtered network topology map (720D); and the aforementioned or another egress or outbound physical network interface (e.g., eth12 for ND2 and eth5 for ND5) on the network device that leads or points to the fifth destination network endpoint (R5) (714E) per the example filtered network topology map (720D).

Turning to FIG. 7O, network devices ND2 and ND5 each update their respective implementation of the second multicast flow F2 based on their respective received multicast flow editing instructions (738A, 738B). Further, said update leads to change(s) in their respective network device state, which synchronizes with (and thus aggregates as new aggregated non-homogeneous network state stored in) a network state database (see e.g., FIG. 2B) on the network controller (704B). The network controller (704B) subsequently processes the new aggregated non-homogeneous network state to produce homogeneous network multicast state that relates to an active-flow(s) multicast state context. Accordingly, the network controller (704B) generates multicast state notification(s) (740) incorporating the homogeneous network multicast state, or more specifically, a combination of the information pertaining to the second multicast flow F2 presented in the second information entry of the provisioned multicast flow information (722D) (see e.g., FIG. 7M) and delivered through the sets of multicast flow editing instructions (738A, 738B) (see e.g., FIG. 7N). Following their generation, the multicast state notification(s) (740) is/are published through a notification channel matching the active-flow(s) multicast state context, where said multicast state notification(s) (740) is/are immediately consumed by subscribing entities (e.g., the system controller (702)) of the aforementioned notification channel.

In the above description of FIGS. 1-7O, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms “before”, “after”, “single”, and other such terminology. Rather, the use of ordinal numbers is to distinguish between the elements. By way of an example, a first element is distinct from a second element, and the first element may encompass more than one element and succeed (or precede) the second element in an ordering of elements.

Throughout the application, the phrase ‘connected’ may be used to describe a connection between components. As used hereinafter, the aforementioned phrase may refer to any direct (e.g., wired directly between two or more components) or indirect (e.g., wired and/or wireless connections between any number of components connecting the connected components) connection.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method for multicast flow provisioning in a network, the method comprising:

obtaining network device state for each of a plurality of network devices of the network;

deriving, based on the network device state for each of the plurality of network devices, a network topology map of the network that identifies the plurality of network devices and a plurality of network links between the plurality of network devices;

associating each network link in the plurality of network links with a corresponding available link bandwidth that remains after provisioning one or more existing multicast flows;

receiving, for an additional multicast flow, a multicast flow provisioning request comprising a maximum multicast flow bandwidth;

removing, from the network topology map, one or more of the plurality of network links, for each of which the available link bandwidth is less than the maximum multicast flow bandwidth;

identifying a plurality of network paths through the network, each connecting a source network endpoint to a destination network endpoint of a plurality of destination network endpoints, by identifying, from the network topology map with the one or more of the plurality of network links removed, a subset of network links that forms the plurality of network paths; and provisioning, to fulfill the multicast flow provisioning request, the additional multicast flow based on the plurality of network paths.

2. The method of claim 1, further comprising:

removing, from the network topology map, one or more of the plurality of network devices based on the one or more of the plurality of network links being removed, wherein the subset of network links are identified from the network topology map with the one or more of the plurality of network links removed and with the one or more of the plurality of network devices removed.

3. The method of claim 2, wherein the subset of network links forms a multicast distribution tree.

4. The method of claim 1, wherein the corresponding available link bandwidths associated with the plurality of network links are stored in an available link bandwidth table.

5. The method of claim 1, wherein the corresponding available link bandwidths associated with the plurality of network links reflect available link bandwidths following provisioning of the one or more existing multicast flows and prior to provisioning the additional multicast flow.

6. The method of claim 1, wherein a first network path in the plurality of network paths at least partly overlaps a second network path in the plurality of network paths.

7. The method of claim 1, wherein the multicast flow provisioning request further comprises a source network address associated with the source network endpoint and a plurality of destination network addresses associated with the plurality of destination network endpoints, respectively.

8. The method of claim 7, wherein provisioning the additional multicast flow comprises:

obtaining a multicast destination group network address associated with a multicast destination group assigned to the additional multicast flow, wherein members of the multicast destination group comprise the plurality of destination network endpoints;

identifying a set of network devices of the plurality of network devices situated along the plurality of network paths; and for each network device in the set of network devices:

selecting an ingress physical network interface leading to the source network endpoint and at least one egress physical network interface leading to at least one destination network endpoint of the plurality of destination network endpoints;

generating multicast provisioning instructions for the additional multicast flow that comprise the source network address, the multicast destination group network address, the ingress physical network interface, and the at least one egress physical network interface; and delivering the multicast provisioning instructions to the corresponding network device.

9. The method of claim 1, wherein the network device state for each of the plurality of network devices is obtained by a network controller distinct from the plurality of network devices, wherein the network topology map is derived by the network controller, and wherein the plurality of network paths through the network, connecting the source network endpoint to the plurality of destination network endpoints, is identified by the network controller.

10. A system comprising:

a network controller overseeing and connected to network devices in a network, the network devices connecting a source network endpoint to destination network endpoints, wherein the network controller is distinct from the network devices, the source network endpoint, and the destination network endpoints, and wherein the network controller comprises a computer processor configured to:

provide provisioned multicast flow information identifying one or more multicast flows provisioned on the network;

provide available link bandwidth information identifying available link bandwidths of network links of the network that remain after provisioning the one or more multicast flows;

identify, for a new multicast flow from the source network endpoint to the destination network endpoints to be provisioned, a maximum multicast flow bandwidth;

identify at least a given network device of the network devices as an island node based on the available link bandwidth information and the maximum multicast flow bandwidth;

identify, for the new multicast flow, a multicast distribution tree comprising a plurality of network paths through the network by identifying a subset of the network links of the network based on the maximum multicast flow bandwidth for the new multicast flow not exceeding the available link bandwidths of the subset of the network links and based on a network topology of the network that omits the given network device; and provision the new multicast flow on the network based on the multicast distribution tree.

11. The system of claim 10, wherein the network devices are interconnected using a spine-leaf network topology.

12. The system of claim 10, wherein each network device of the network devices is a single-homed network device.

13. The system of claim 10, wherein the network controller is connected to a dual-homed network device that is connected to the network devices.

14. The system of claim 13, wherein the dual-homed network device is directly connected to the source network endpoint.

15. The system of claim 13, wherein the dual-homed network device is connected to additional network devices in a second network and wherein the network and the second network are each representative of a hybrid air-gapped network.

16. The system of claim 15, wherein the network and the second network are implemented using active-active network redundancy.

17. The system of claim 15, the system further comprising:

a second network controller overseeing and connected to the additional network devices, wherein the second network controller comprises a second computer processor configured to:

identify, for the new multicast flow, a second multicast distribution tree comprising a second plurality of network paths through the second network; and provision the new multicast flow on the second network based on the second multicast distribution tree.

18. The system of claim 17, wherein the second network controller is further connected to the dual-homed network device.

19. The system of claim 17, wherein the destination network endpoints comprise a plurality of dual-homed network endpoints each directly connected to the network and the second network.

20. A system comprising:

a network controller overseeing and connected to network devices in a network, the network devices connecting a source network endpoint to destination network endpoints, wherein the network controller is distinct from the network devices, the source network endpoint, and the destination network endpoints, and wherein the network controller comprises a computer processor configured to:

obtain network device state for each of the network devices;

derive a network topology map of the network based on the network state for each of the network devices, wherein the network topology map identifies the network devices as nodes and identifies network links between the network devices as edges;

provide an available link bandwidth table that includes an available link bandwidth for each of the network links;

receive a multicast flow provisioning request to provision a new multicast flow from the source network endpoint to the destination network endpoints on the network, the multicast flow provisioning request identifying the new multicast flow and including a maximum multicast flow bandwidth for the new multicast flow;

identify, for the new multicast flow, a multicast distribution tree comprising a plurality of network paths that include at least a portion of the network devices and at least a portion of the network links based on the maximum multicast flow bandwidth in the multicast flow provisioning request not being exceeded by each of the available link bandwidths included in the available link bandwidth table for at least the portion of the network links in the plurality of network paths, wherein the plurality of network paths include one or more overlapping network links; and provision the new multicast flow on at least the portion of the network devices based on the multicast distribution tree.

* * * * *